Nov. 29, 1960 L. DE FLOREZ ET AL 2,961,778
HELICOPTER FLIGHT SIMULATION AND PILOT TRAINING DEVICE
Filed Sept. 30, 1955 18 Sheets-Sheet 1

INVENTORS:
LUIS de FLOREZ, EDWIN K. SMITH, JR.
and CLARENCE P. ANDRADE, JR.
BY
Bean, Brooks, Buckley & Bean,
ATTORNEYS.

Nov. 29, 1960   L. DE FLOREZ ET AL   2,961,778
HELICOPTER FLIGHT SIMULATION AND PILOT TRAINING DEVICE
Filed Sept. 30, 1955   18 Sheets-Sheet 2
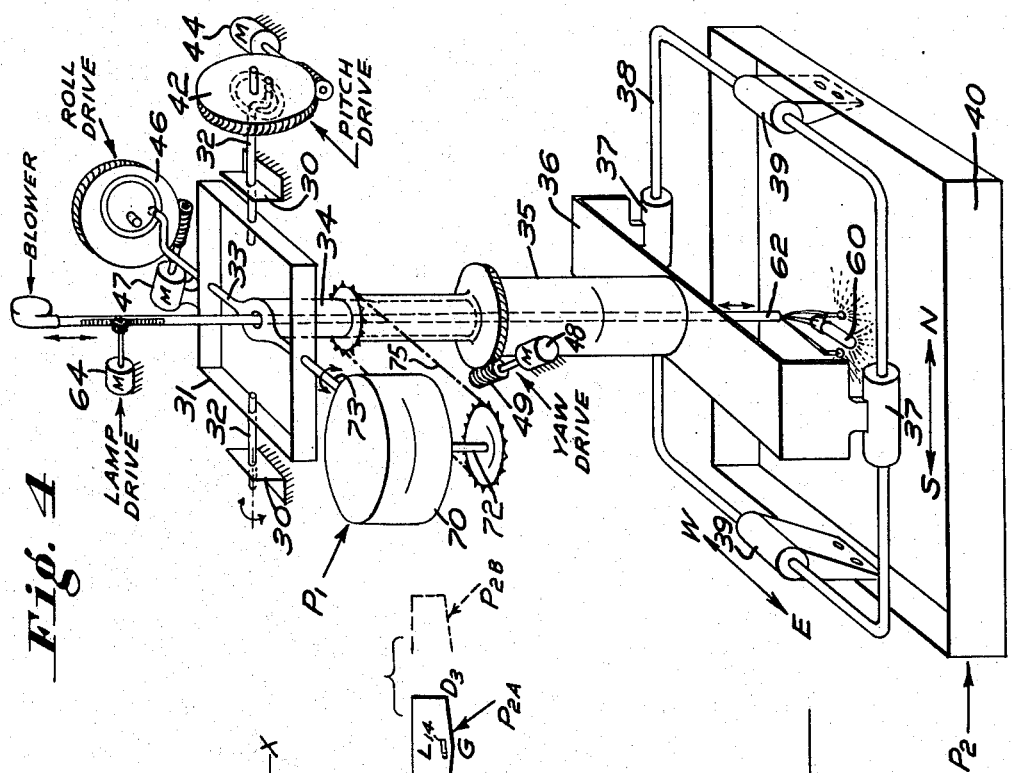
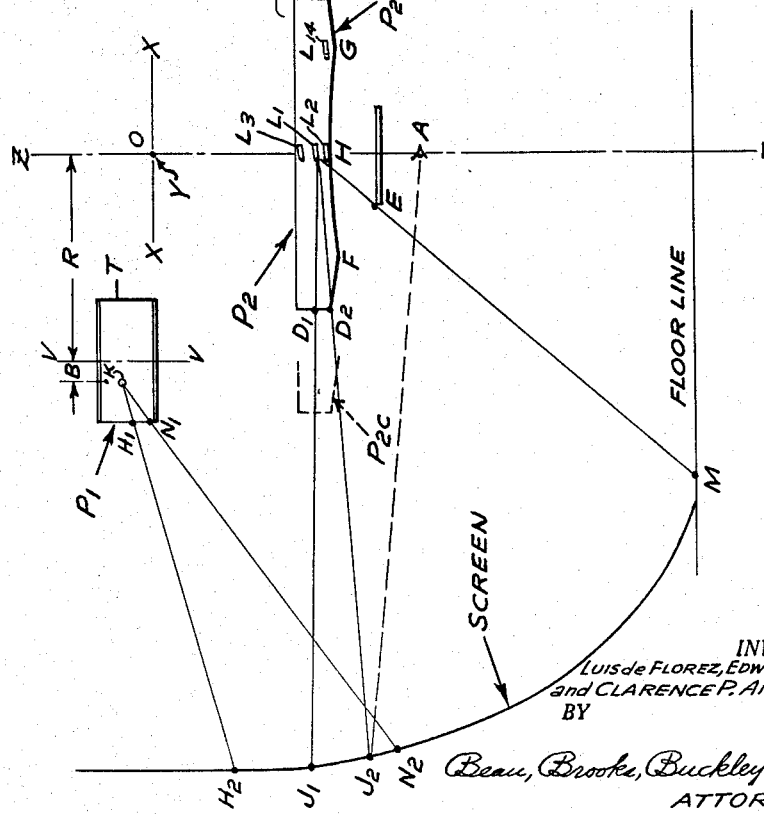
INVENTORS:
Luis de FLOREZ, Edwin K. SMITH, JR.
and CLARENCE P. ANDRADE, JR.
BY
Beau, Brooke, Buckley & Beau,
ATTORNEYS.

Nov. 29, 1960  L. DE FLOREZ ET AL  2,961,778
HELICOPTER FLIGHT SIMULATION AND PILOT TRAINING DEVICE
Filed Sept. 30, 1955  18 Sheets-Sheet 3
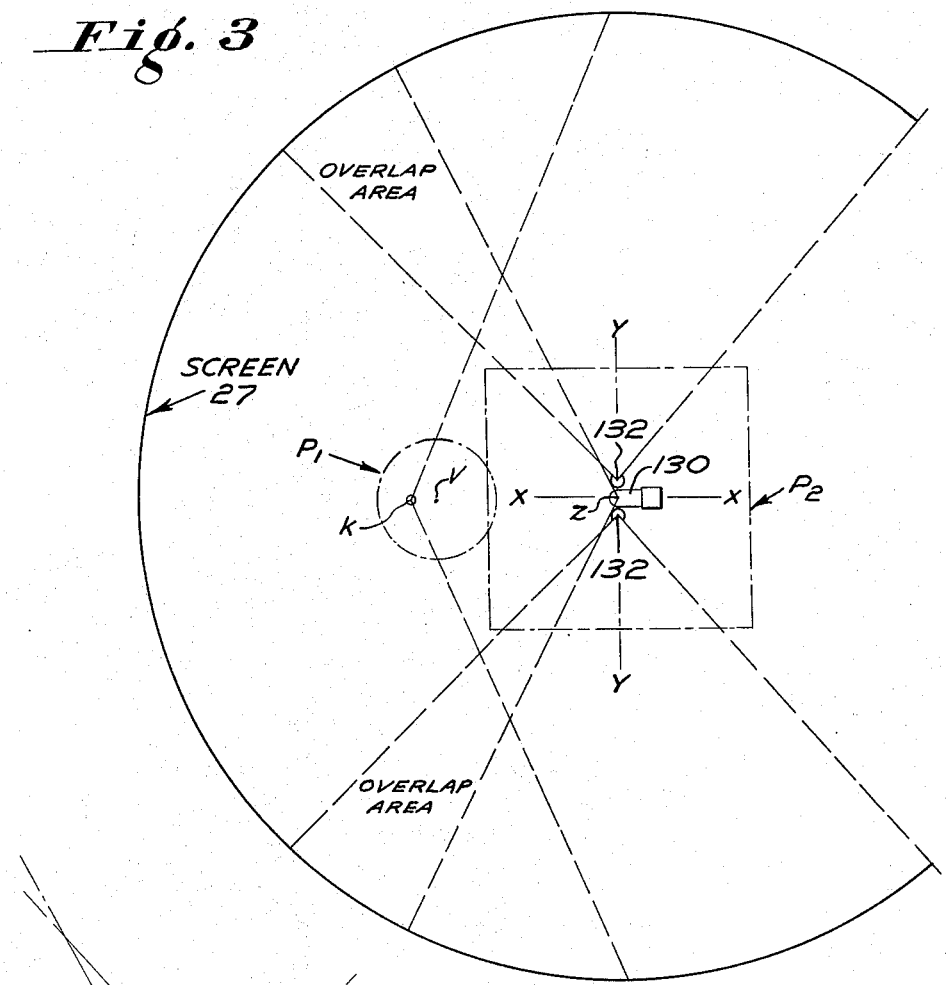
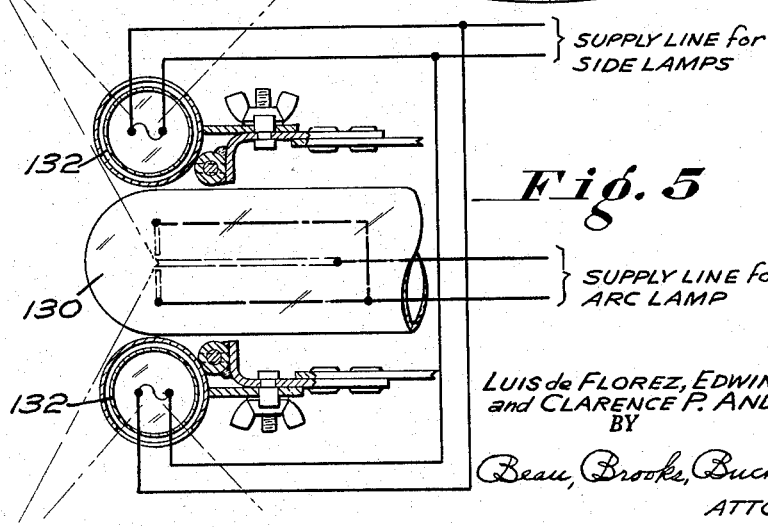
INVENTORS:
LUIS de FLOREZ, EDWIN K. SMITH, JR.
and CLARENCE P. ANDRADE, JR.
BY
Beau, Brooks, Buckley & Beau,
ATTORNEYS.

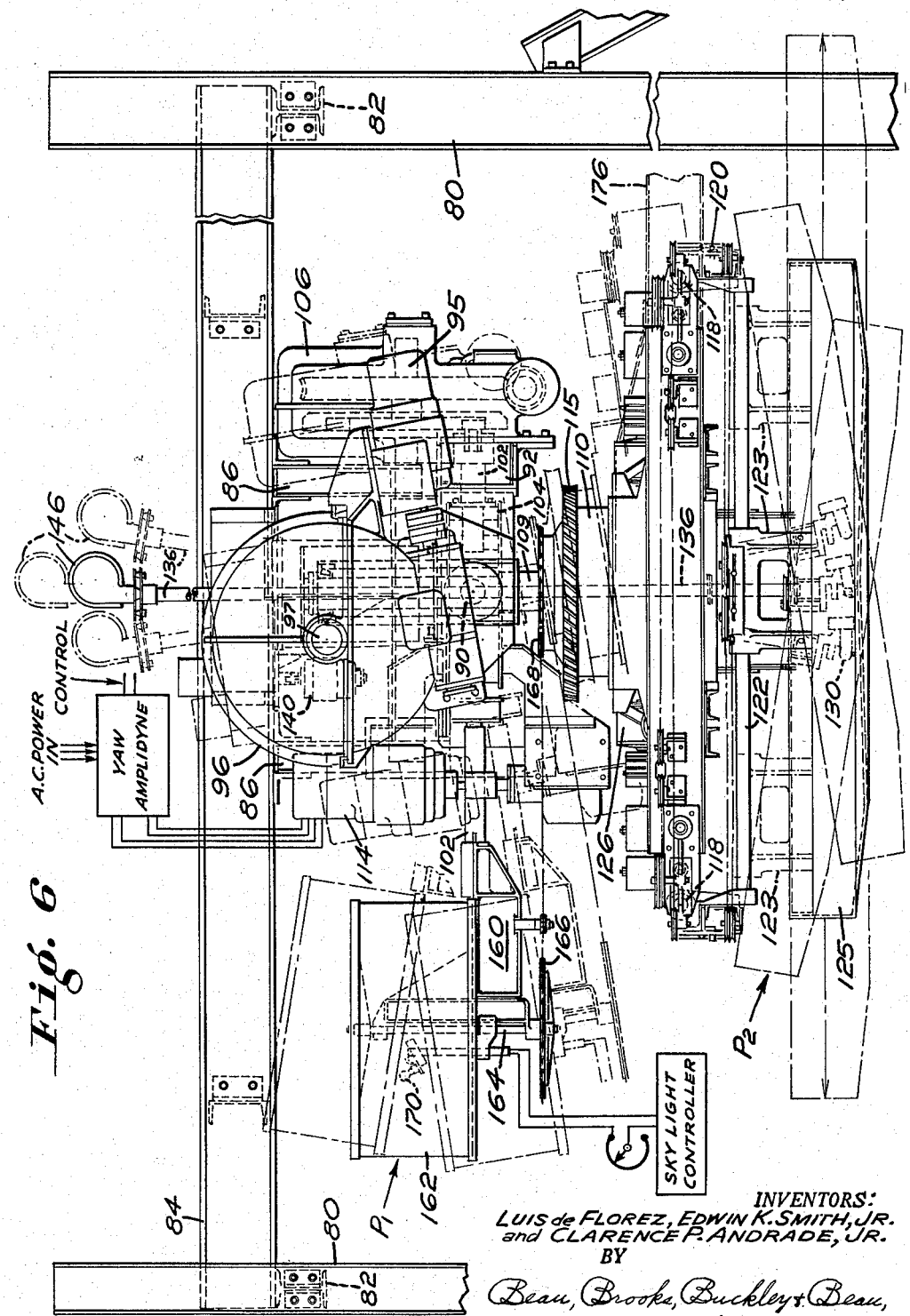

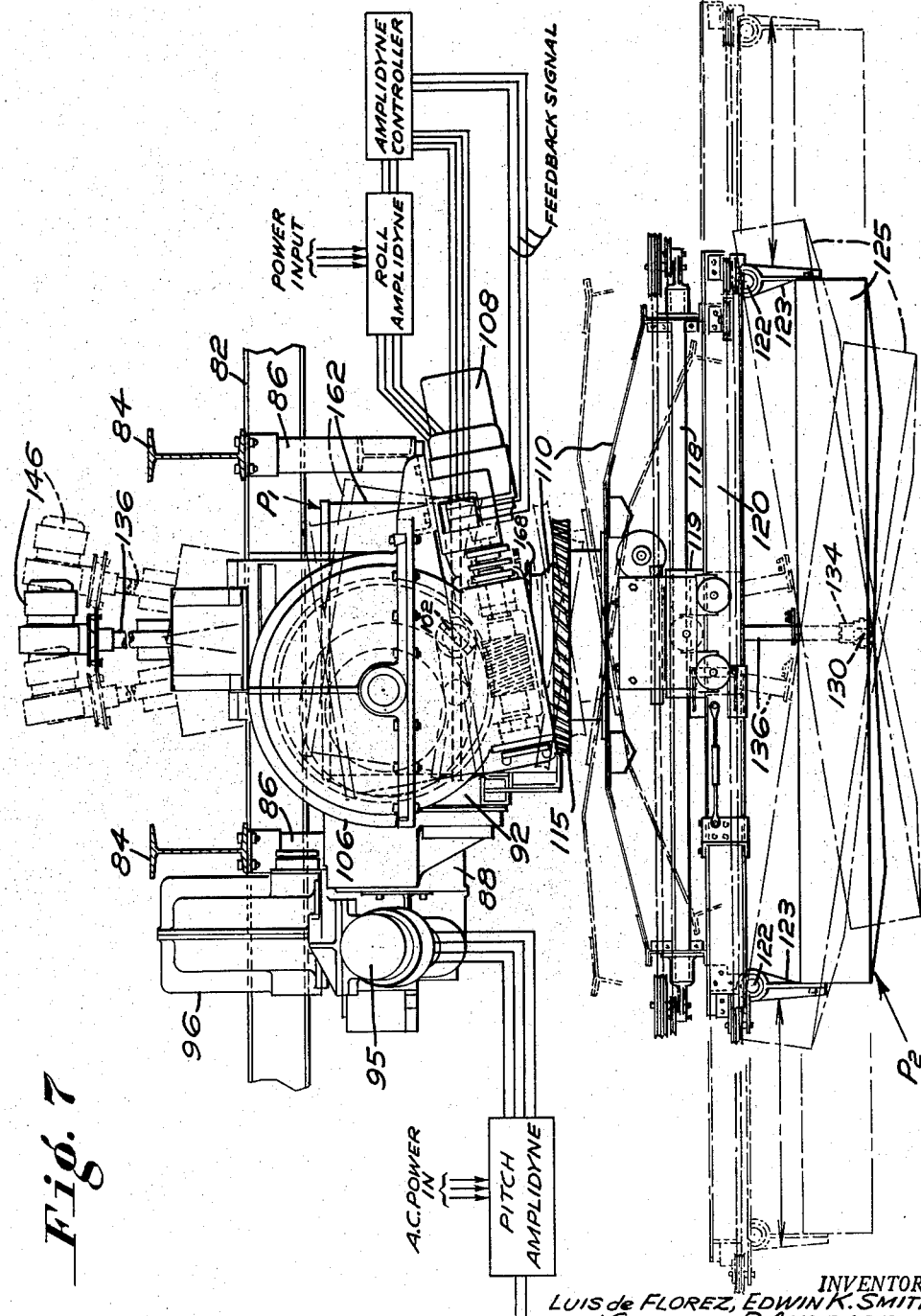

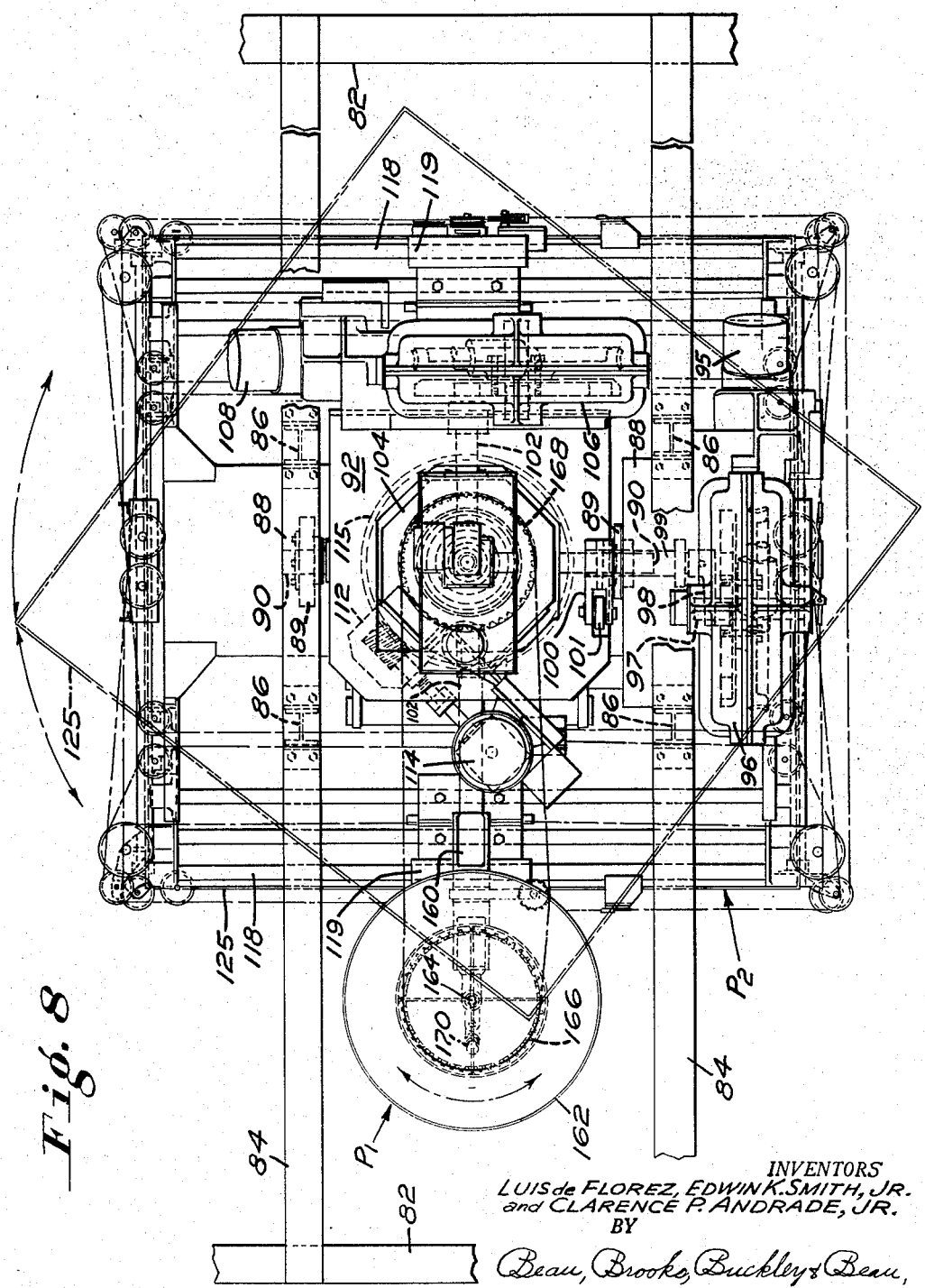

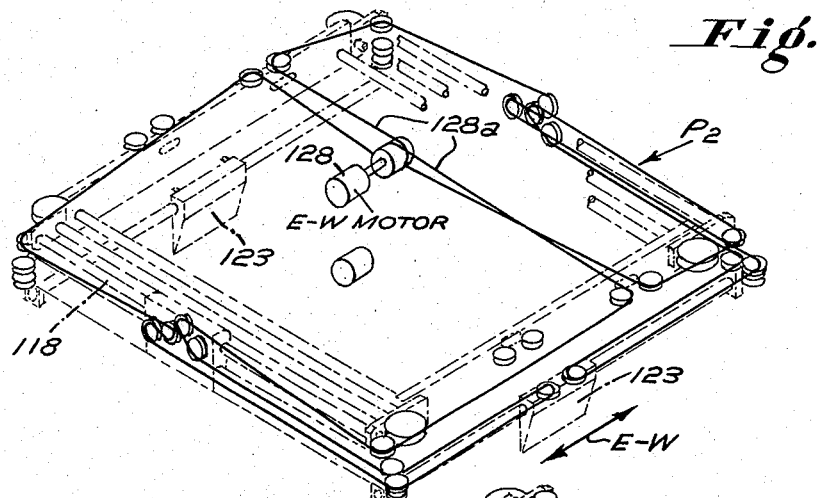
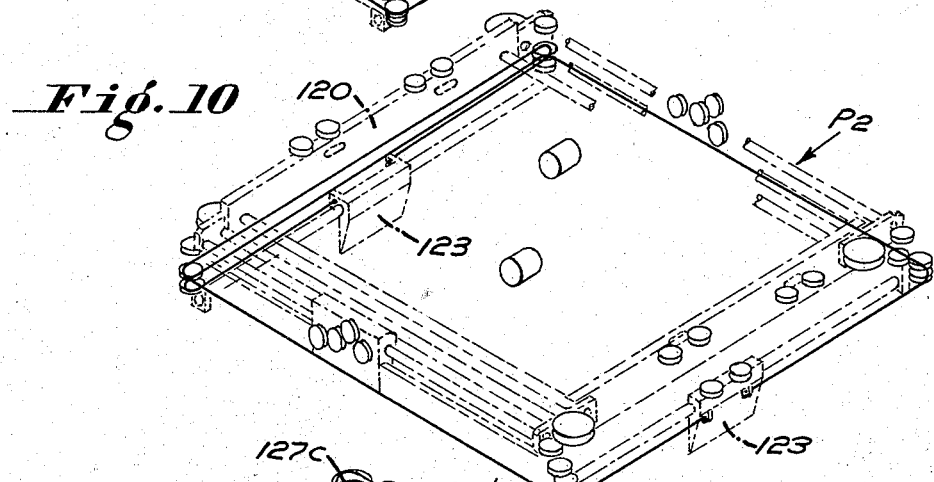
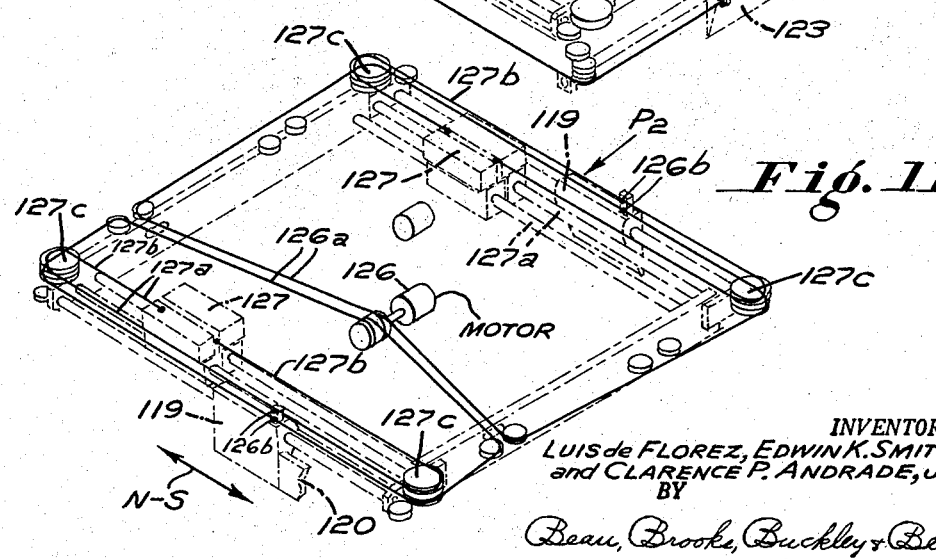

Nov. 29, 1960   L. DE FLOREZ ET AL   2,961,778
HELICOPTER FLIGHT SIMULATION AND PILOT TRAINING DEVICE
Filed Sept. 30, 1955   18 Sheets-Sheet 8

INVENTORS:
LUIS de FLOREZ, EDWIN K. SMITH, JR.
and CLARENCE P. ANDRADE, JR.
BY
Beau, Brooks, Buckley & Beau,
ATTORNEYS.

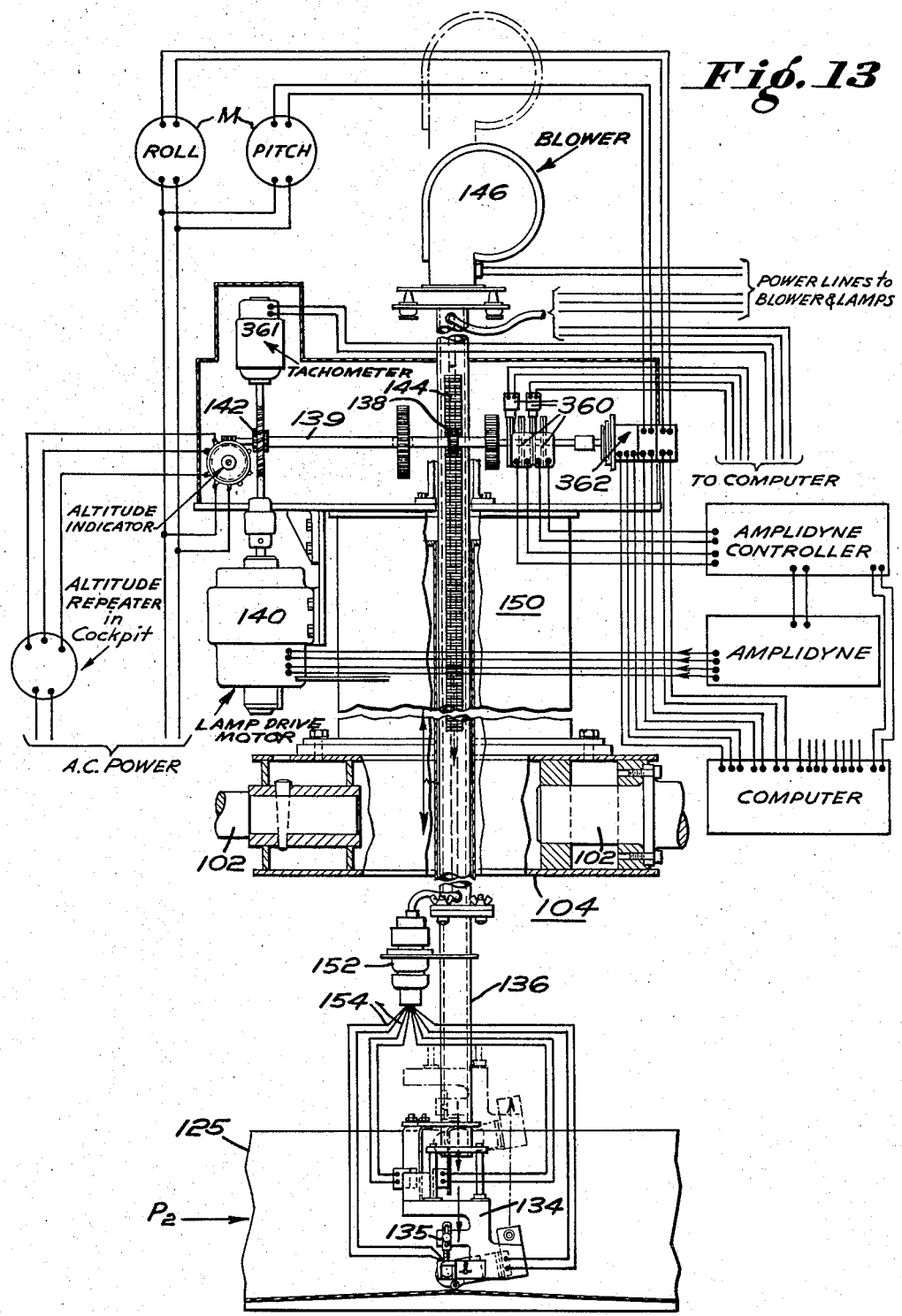

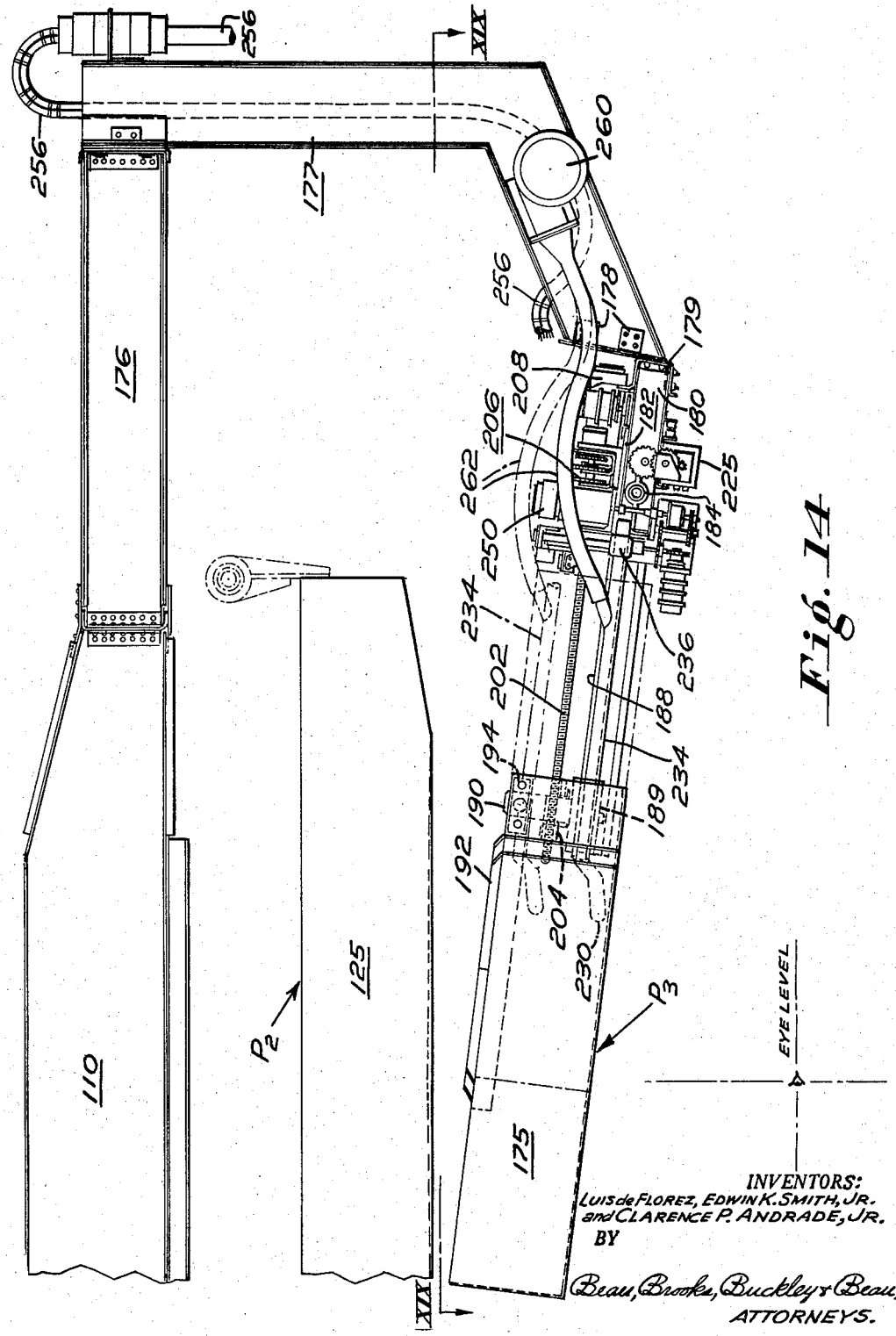

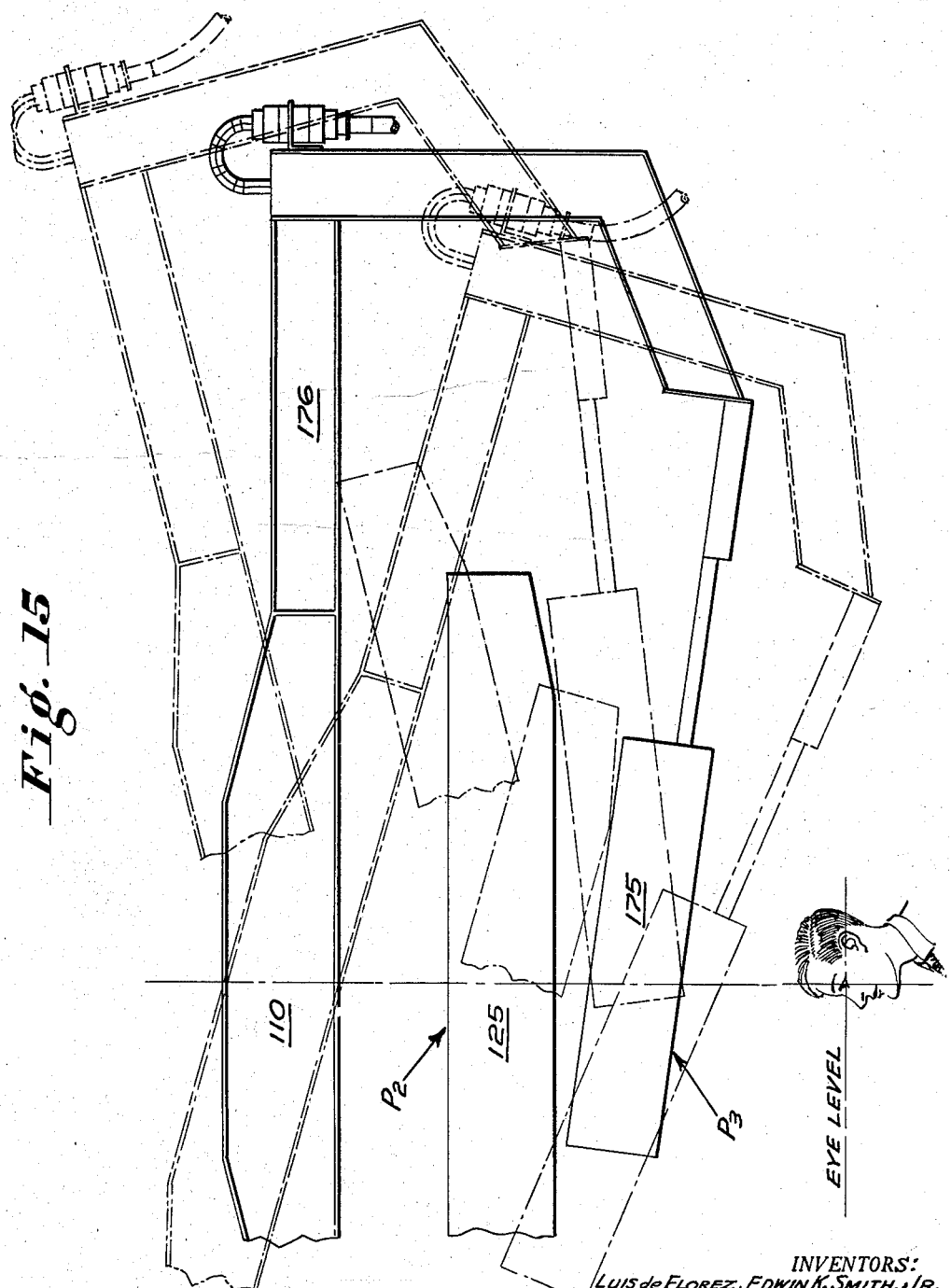

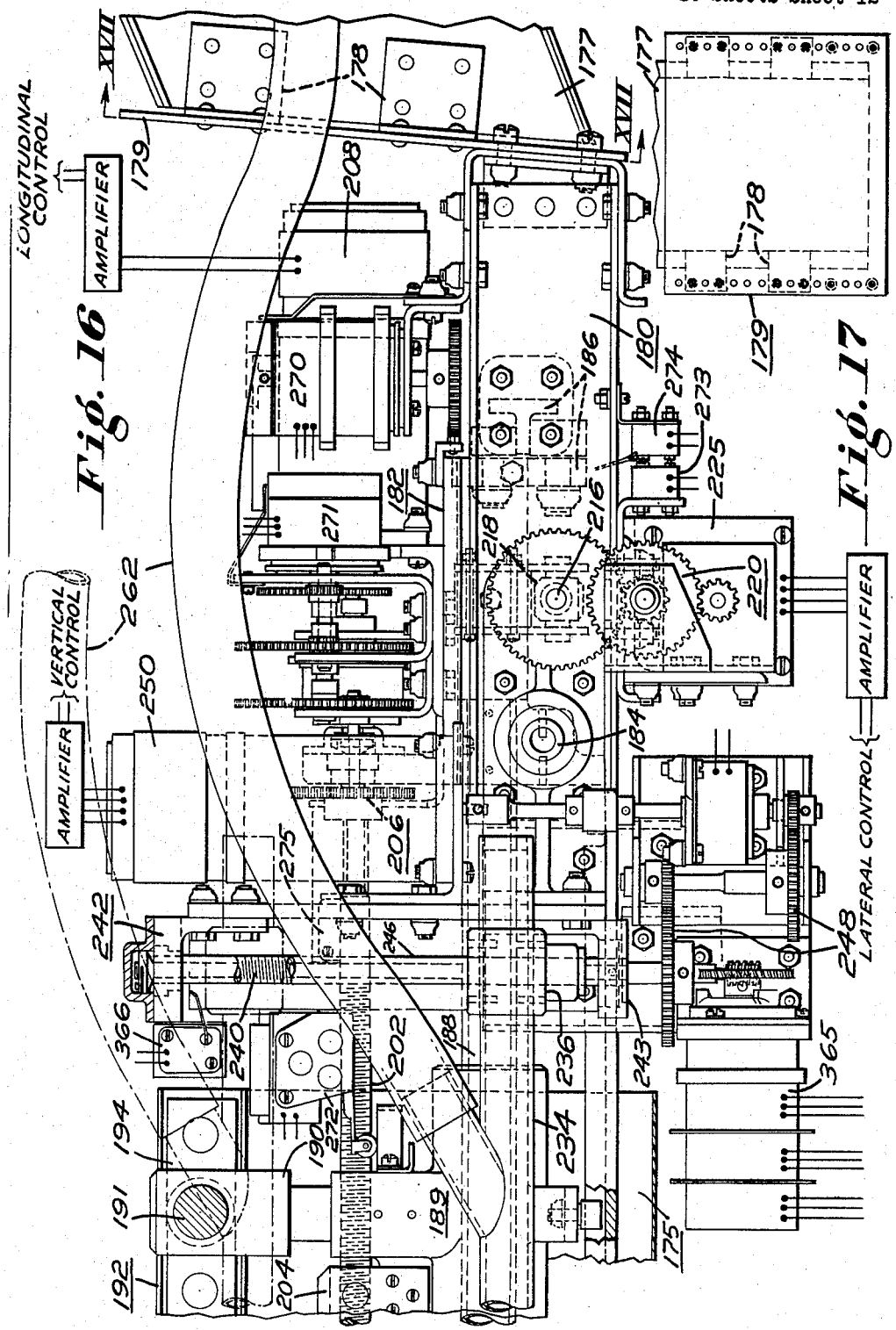

Nov. 29, 1960 L. DE FLOREZ ET AL 2,961,778
HELICOPTER FLIGHT SIMULATION AND PILOT TRAINING DEVICE
Filed Sept. 30, 1955 18 Sheets-Sheet 13
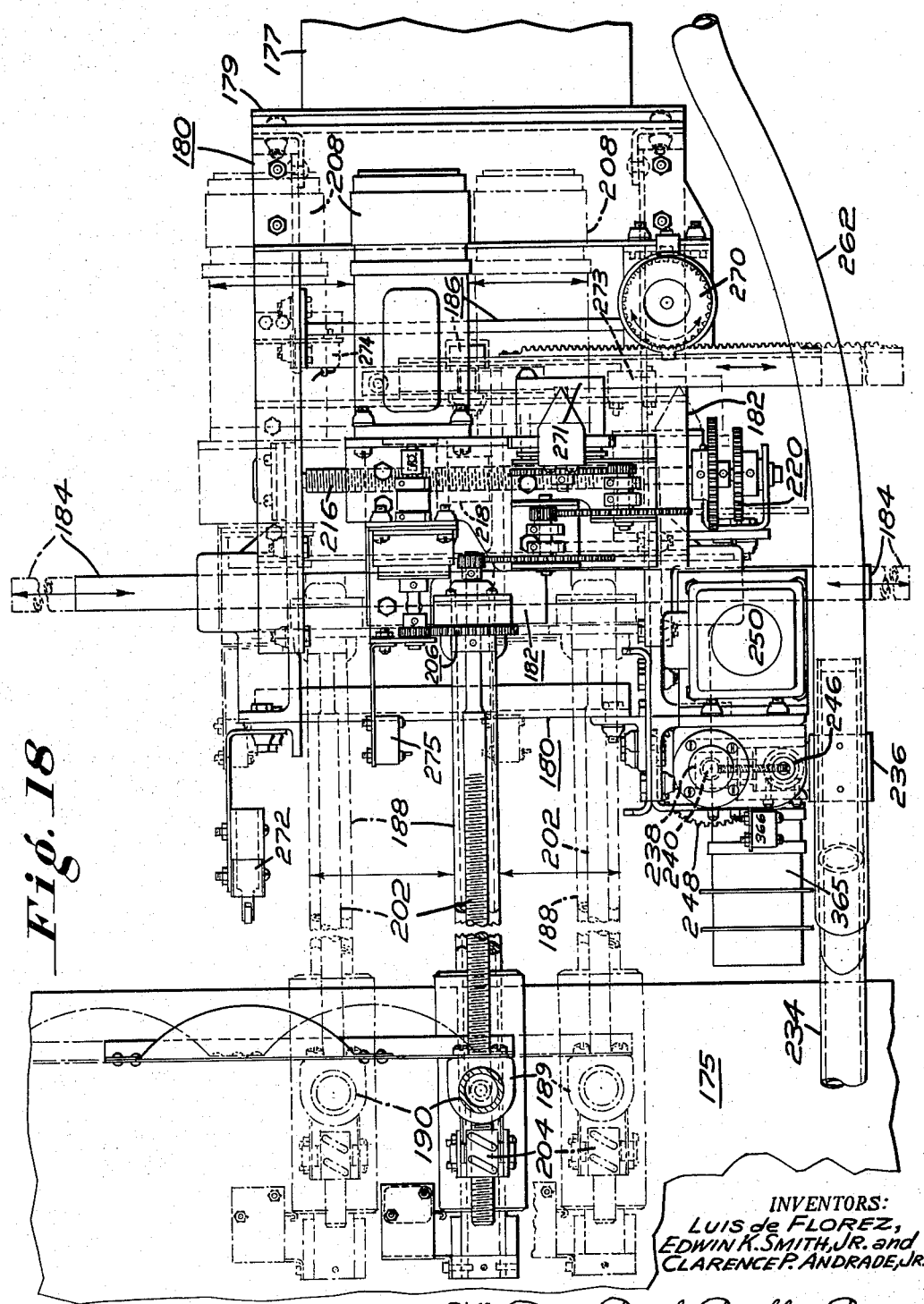
INVENTORS:
LUIS de FLOREZ,
EDWIN K. SMITH, JR. and
CLARENCE P. ANDRADE, JR.
BY: Beau, Brooks, Buckley & Beau,
ATTORNEYS.

Nov. 29, 1960     L. DE FLOREZ ET AL     2,961,778
HELICOPTER FLIGHT SIMULATION AND PILOT TRAINING DEVICE
Filed Sept. 30, 1955     18 Sheets-Sheet 14
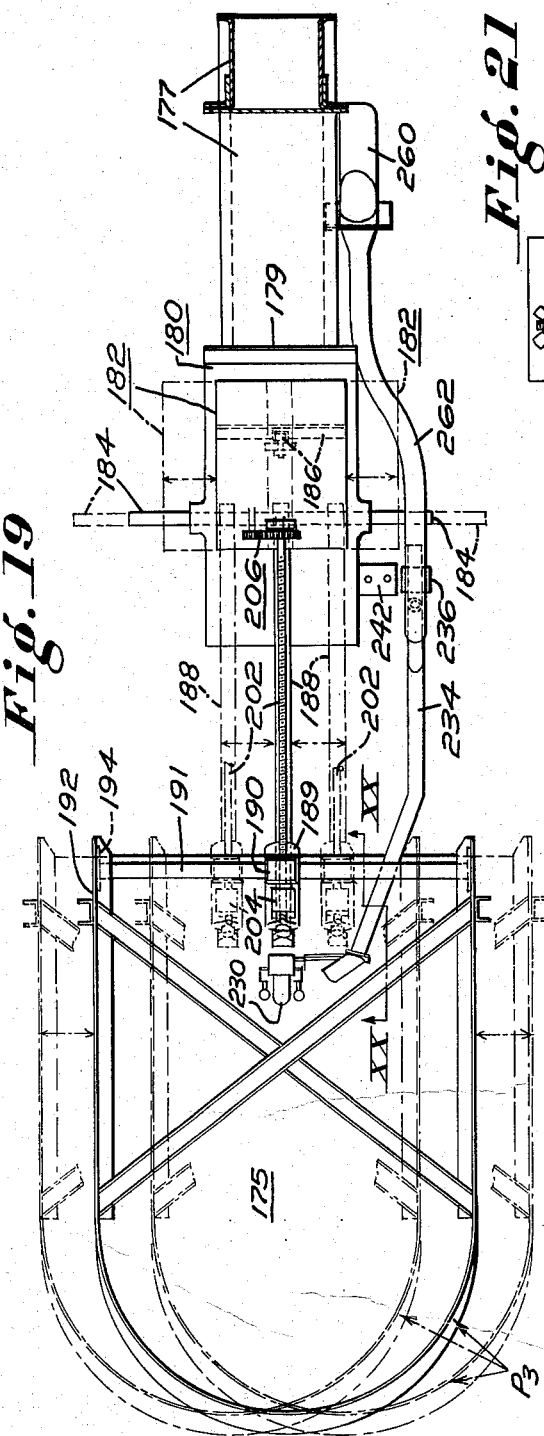
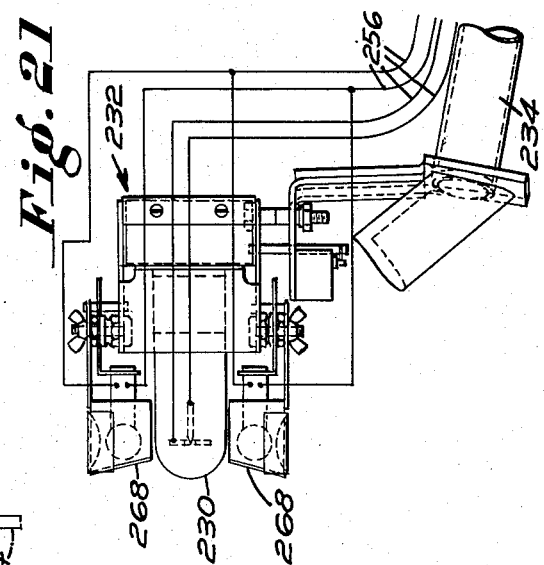
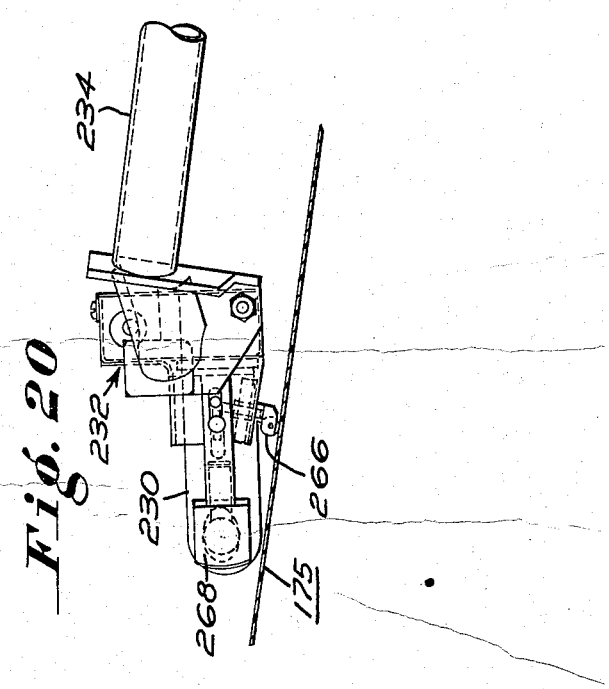
INVENTORS
LUIS de FLOREZ, EDWIN K. SMITH, JR
and CLARENCE P. ANDRADE, JR.
BY
Beau, Brooks, Buckley & Beau,
ATTORNEYS.

Nov. 29, 1960 L. DE FLOREZ ET AL 2,961,778
HELICOPTER FLIGHT SIMULATION AND PILOT TRAINING DEVICE
Filed Sept. 30, 1955 18 Sheets-Sheet 15
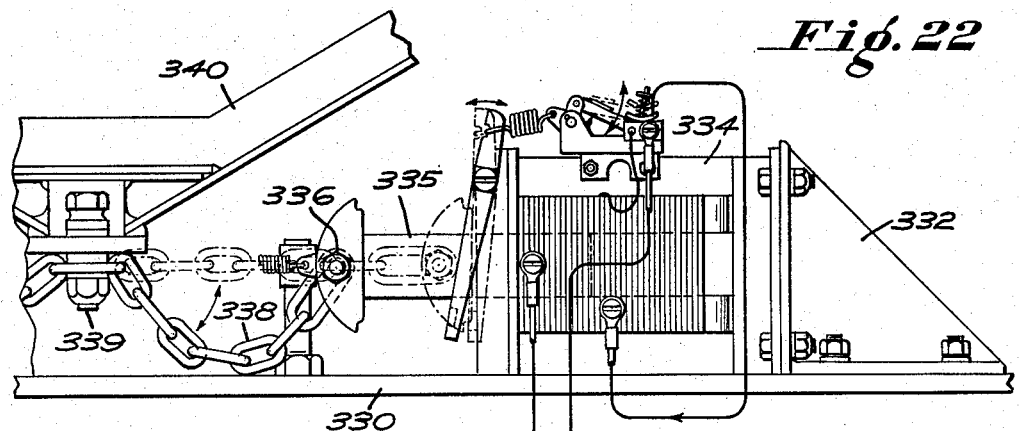
Fig. 22
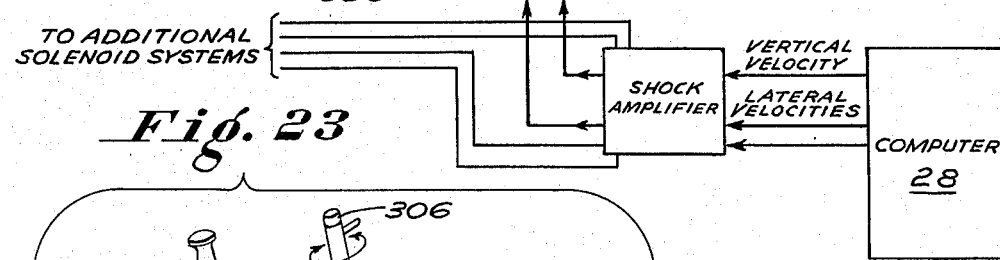
Fig. 23
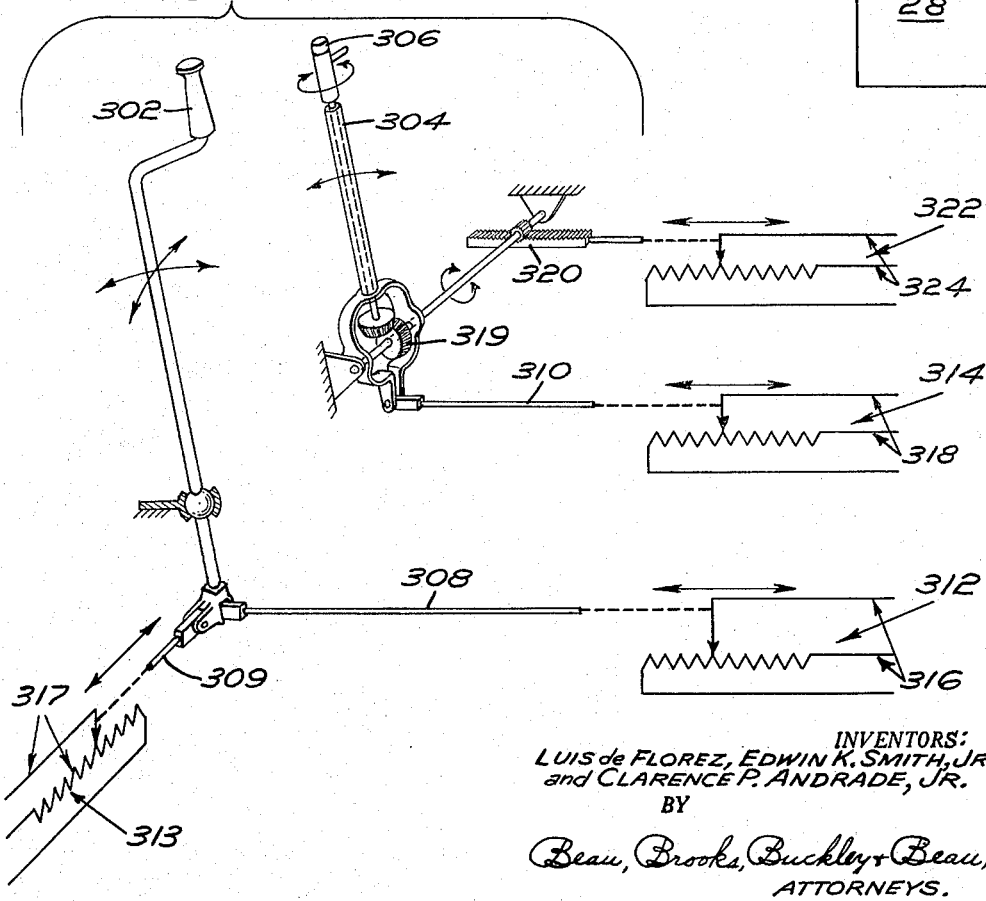
INVENTORS:
LUIS de FLOREZ, EDWIN K. SMITH, JR.
and CLARENCE P. ANDRADE, JR.
BY
Beau, Brooks, Buckley + Beau,
ATTORNEYS.

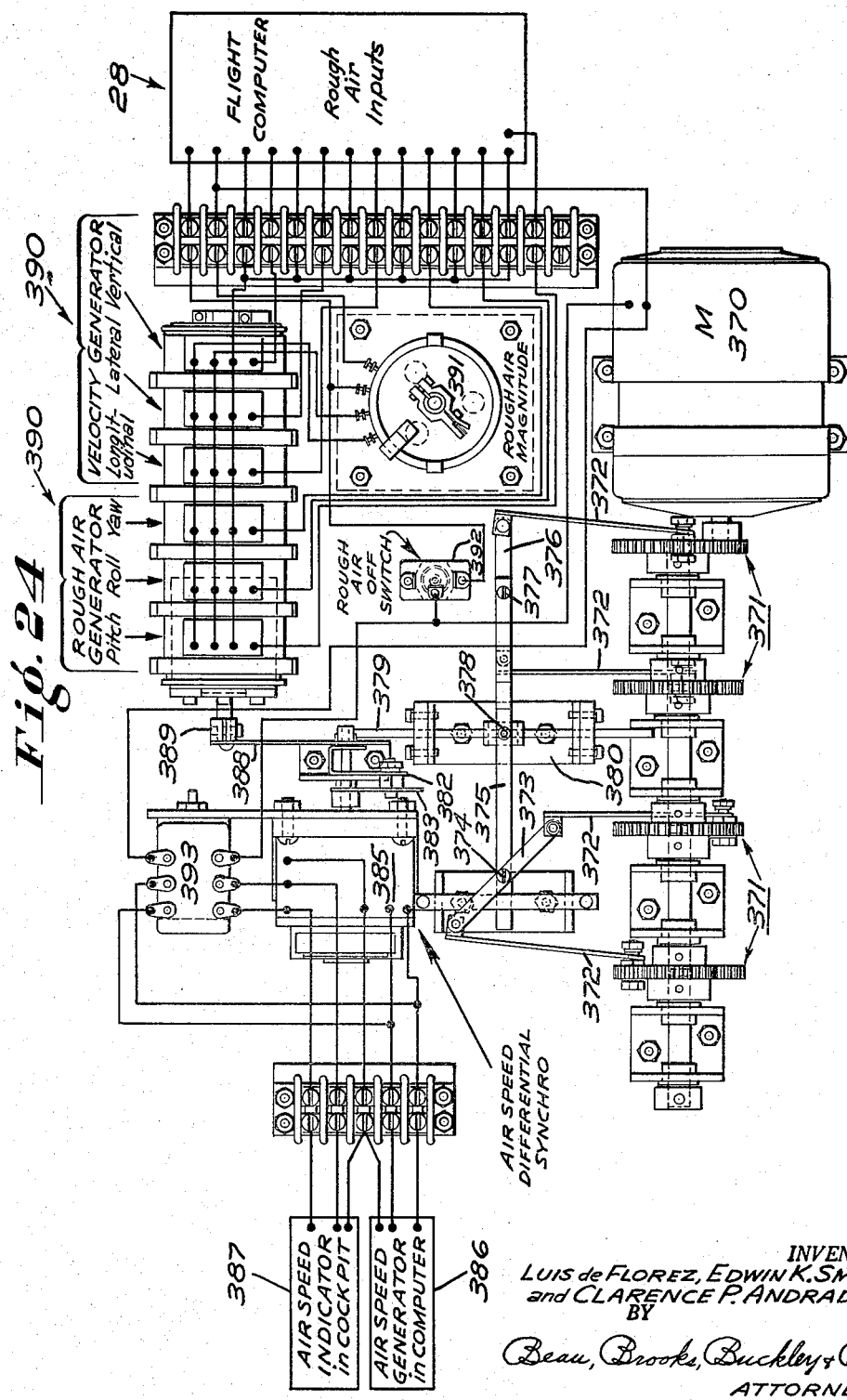

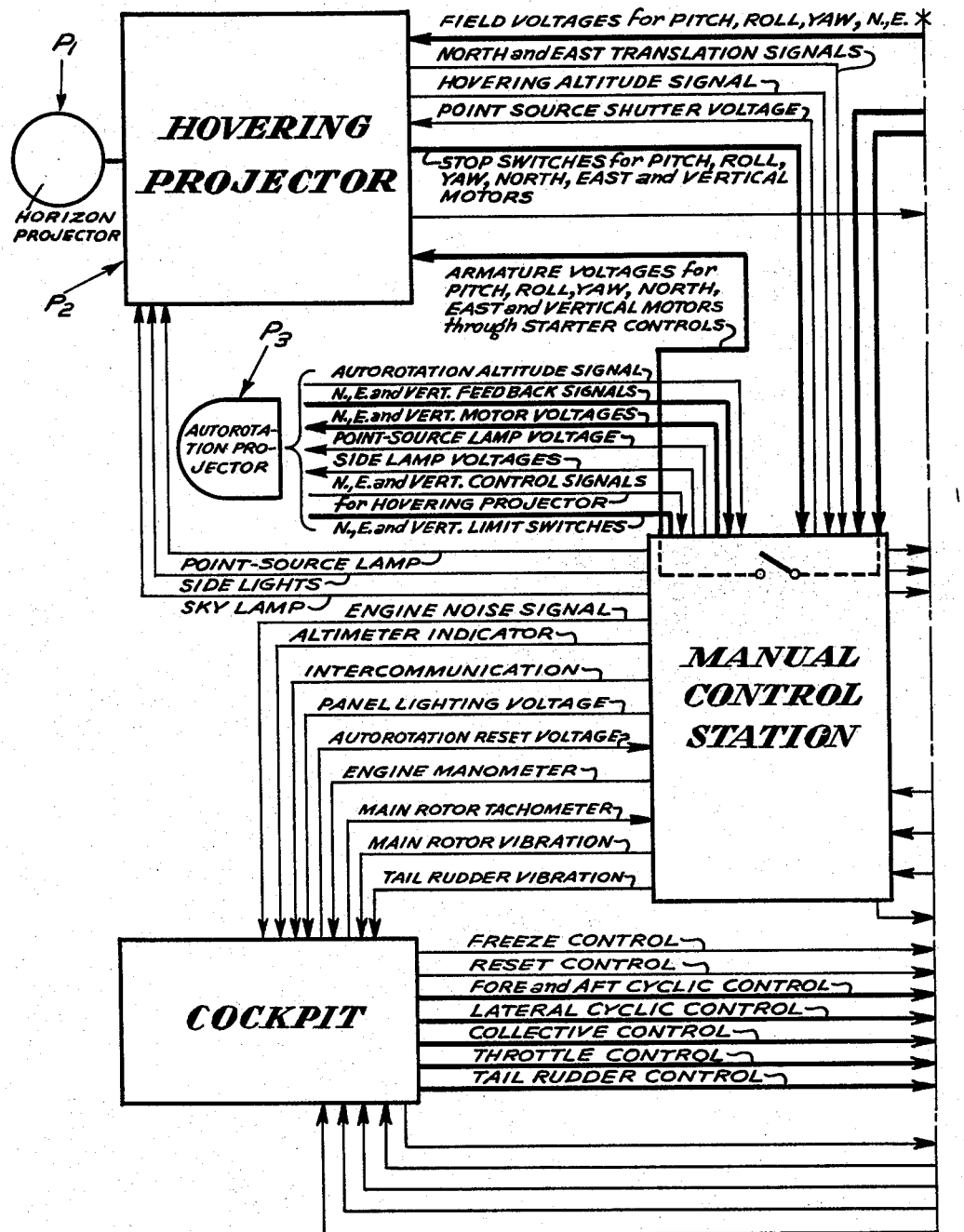

Nov. 29, 1960      L. DE FLOREZ ET AL      2,961,778
HELICOPTER FLIGHT SIMULATION AND PILOT TRAINING DEVICE
Filed Sept. 30, 1955      18 Sheets-Sheet 18

INVENTORS:
LUIS de FLOREZ, EDWIN K. SMITH, JR.
and CLARENCE P. ANDRADE, JR.
BY
Beau, Brooks, Buckley & Beau,
ATTORNEYS.

United States Patent Office 2,961,778
Patented Nov. 29, 1960

2,961,778

HELICOPTER FLIGHT SIMULATION AND PILOT TRAINING DEVICE

Luis De Florez, Pomfret, Conn., Edwin K. Smith, Jr., Tarrytown, N.Y., and Clarence P. Andrade, Jr., Lumberville, Pa., assignors, by mesne assignments, to Bell Aerospace Corporation Filed Sept. 30, 1955, Ser. No. 537,700

22 Claims. (Cl. 35—12)

This invention relates to aviator trainers, and more particularly to grounded helicopter pilot training apparatus. The invention contemplates means for accurately simulating helicopter flight conditions in association with a grounded helicopter pilot's compartment, and a control organization so arranged as to provide to the student pilot visual simulations of the aircraft response to manipulations of the control devices consistent with typical operational conditions, as well as typical responses of the aircraft to external influences and to corrective control maneuvers performed by the student pilot in response to the flight maneuver simulations.

Whereas numerous grounded pilot trainer mechanisms have been previously devised for use in connection with the training of fixed wing aircraft pilots, the training of helicopter pilots presents many different and difficult problems. The visual cues necessary for proper contact piloting of helicopter aircraft or the like are so numerous and complex and different from cues and problems met with in connection with fixed wing aircraft operations, that accurate recognition and analysis of the problems is complicated and difficult as to preclude the possibility of accurate artificial duplication thereof. For example, when considering stabilization and maneuvering of helicopter flight in the longitudinal mode, it is appreciated that the pilot readily visualizes pitching velocities and displacements, as well as translational velocities and displacements. However, these quantities are perceived in a number of ways, such as by the apparent size of scenery objects and the rate of change of their size; perspective and its changes; binocular distance perception; and by pure movements in the visional sense. Accordingly, instead of selecting analogs for any of these values according to some rational approximations of relative importance, it would obviously be more effective to accurately synthesize the entire visual situation.

Furthermore, the necessity of learning the meaning of arbitrary forms of information and unlearning incorrect forms at later date would be eliminated by training with a mechanism providing faithful visual simulation; and obviously, the psychological need of realism incidental to any training program is best served by means giving visual completeness and accuracy. The helicopter pilot training problem characteristically differs from the fixed wing pilot problem, especially in the field of hovering and low speed flight operations. In the case of helicopter flight maneuvers body accelerations are normally below human sensing thresholds, and other non-visual effects incidental to helicopter pilot operations are fortunately susceptible to relatively easy simulation.

It is a primary object of the present invention to provide a helicopter pilot trainer apparatus achieving proper visual situation synthesis.

Otherwise stated, it is a primary object of the invention to provide a trainer mechanism comprising a helicopter cabin or cockpit in which are mounted the controls and instruments necessary for hovering and flight, as well as indications of wind gusts and cabin vibrations. Motions of the various controls are detected and sent to an analog computer which converts control movement information into electrical commands to the projector servo systems. These commands result in scenery movements simulating that experienced in a helicopter when excited with identical control movements and wind conditions.

A more specific object of the invention is to provide a practical yet highly effective point light source type visual display mechanism such as will project an accurate and realistic terrain simulation to the view of the student pilot, in association with a control system whereby the effects of control manipulations as well as external flight influence factors are accurately portrayed and perceptible to the student pilot.

Another object of the invention is to provide an apparatus as aforesaid whereby helicopter pilots may be properly trained in shorter time and relatively inexpensively compared to prior methods.

Other objects and advantages of the invention will appear from the specification hereinafter.

The invention contemplates, generally, employment of a point light source visual display technique in such a manner as to form a true perspective image of a typical terrain, according to any aspect from which the said terrain may be viewed. Hence, the image should preferably be in true color, and should extend throughout the normal area of central and peripheral vision of the student pilot; and of course should be realistic enough in appearance to be convincing. The apparatus of the invention operates on the principle that light emanating from a tiny, intense source of light traveling through a field of object miniatures and/or a transparency upon which are printed or otherwise applied opaque, translucent, and/or transparent object miniatures, will cast shadows and images of those miniatures upon a screen surface. Images of the projected objects may thus be viewed to possess appropriate size, shape, perspective, and hence three-dimensional psychological illusions.

Ideally, the eye of the observer would be located at a position coinciding with the position of the light source, so that the images would be totally undistorted. However, because for practical reasons the student pilot's eyes may only be disposed close to but not precisely at the position of the light source, either the image-receiving screen or the transparency should be modified in shape so as to reduce the distortion to acceptable degree. Obviously, the desideratum is to provide the image projections on the screen in such color, size, perspective relationships, and naturalness of motion, as to render the screen inconspicuous and to cause the student pilot to feel that he is moving relative to the terrain rather than that a picture of the terrain is moving about his stationary position. Accomplishment of the above set forth objectives has been obtained by means of an apparatus as illustrated in the accompanying drawings, which of course represents only one exemplification of the invention, and wherein;

Fig. 2 is a side elevational schematic view illustrating principles of the projection system;

Fig. 3 is a corresponding top plan schematic view;

Fig. 4 is a perspective schematic view of the projection transparency and light source mounting and adjustment arrangement;

Fig. 5 is a horizontal sectional view through a typical light source as referred to in Figs. 2–3;

Fig. 6 is a fragmentary side elevational view of an exemplification of the "horizon" projector and the "main" projector, and of their mounting and adjustment arrangements;

Fig. 7 is a right-hand end elevational view of the mechanisms of Fig. 6;

Fig. 8 is a top plan view thereof;

Figs. 9, 10 and 11 are schematic top perspective views of the main projector transparency translation shifting arrangement;

Fig. 13 is a fragmentary vertical sectional view through a light source component of the main projector mechanism, having in association therewith a partial schematic diagram of the control system for the light source moving mechanism;

Fig. 14 is a fragmentary side elevation, of the optionally usuable "autorotation" projection component of the machine;

Fig. 15 is a fragmentary diagrammatic illustration of the range of pitch adjustments of the component of Fig. 14;

Fig. 16 is an enlarged view of a detail of Fig. 14;

Fig. 17 is a fragmentary section taken along line XVII—XVII of Fig. 16;

Fig. 18 is a plan view, on slightly smaller scale, of the mechanism of Fig. 16;

Fig. 19 is a section taken along line XIX—XIX of Fig. 14 and showing the mode of lateral positional adjustment of the transparency component;

Fig. 20 is an enlarged scale fragmentary view taken along line XX—XX of Fig. 19;

Fig. 21 is a top plan of the light source mechanism of Fig. 20;

Fig. 22 is a fragmentary side elevational view of an accessory "cue" device of the mechanism of the invention;

Fig. 23 is a schematic perspective view of typical pilot-manipulatable controls for the system;

Fig. 24 is a combination physical and schematic illustration of accessory control components for the mechanism; and Figs. 25a and 25b compositely illustrate, schematically, an exemplification of the power supply and electrical controls of the system.

Figure 1:
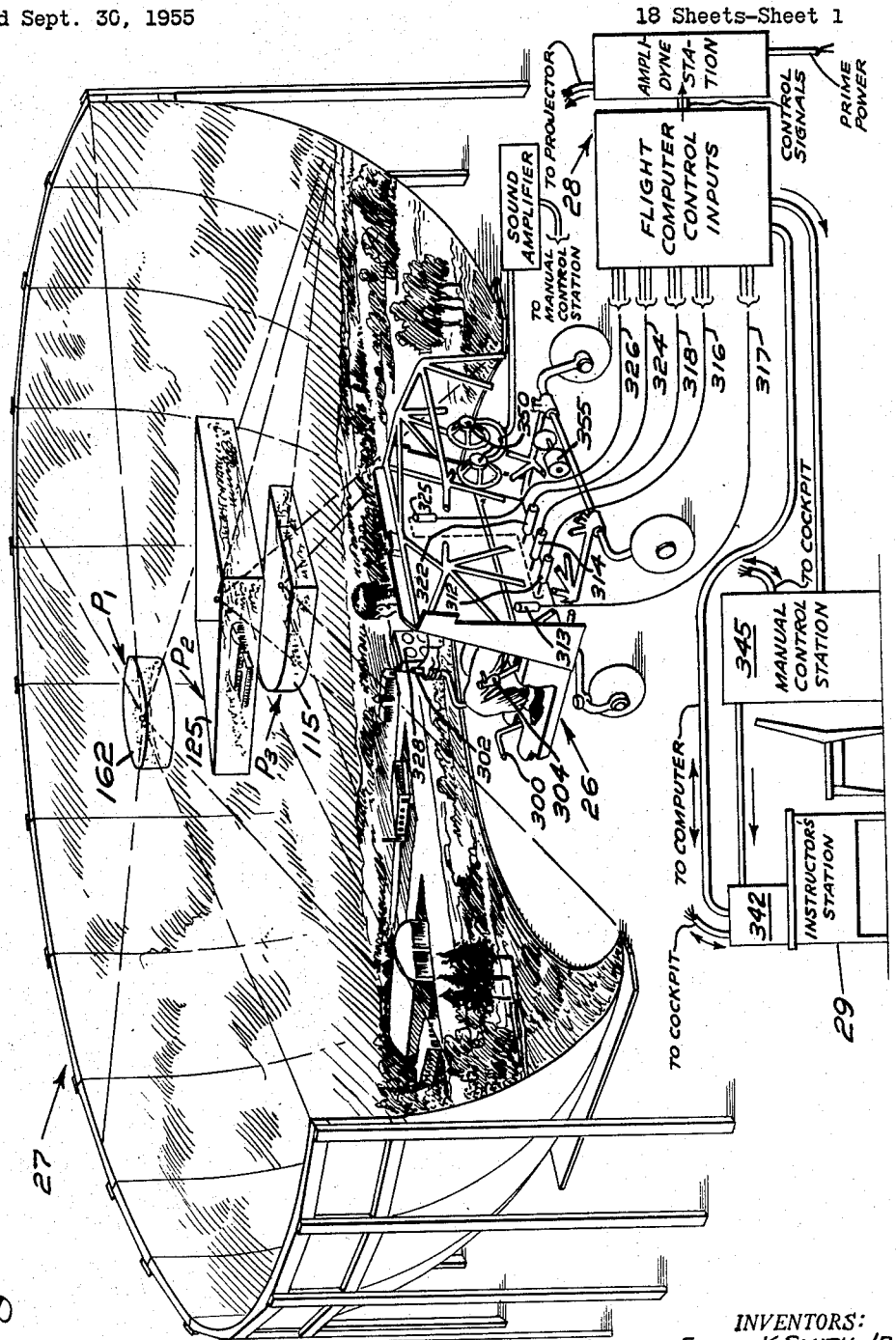
Fig. 1 is a partially perspective and partially schematic view of an apparatus embodying the invention and employing a horizon and sky projector; a main terrain or "hovering" projector; and an optionally usuable "autorotative landing" terrain projector.

Generally stated, the principal components of the apparatus of the invention may be said to include a projection system comprising a screen and either a single or multiple unit projector apparatus; a student pilot cockpit; and a computer mechanism. The projectors and associated screen present to the pilot a visual picture of a simulated surrounding terrain, and the illusion of motions of the helicopter relative thereto as are actually produced by motions of the light sources relative to the transparencies, and/or of the transparencies relative to the screen. The cockpit component preferably comprises a true-size mock-up or otherwise realistic cockpit structure with standard controls and instruments. The computer component receives electrical signals from the pilot's controls, and from an instructor's control station, and introduces them into the equations of motion of the helicopter and thereupon provides output signals which are transmitted to the projector control motors thereby altering the terrain simulation on the screen as viewed by the student pilot in such manner as to simulate scenery appearance changes such as would occur if the helicopter cockpit were in flight and responsive to similar control activity. A manual "stand-by" control station is preferably also provided as an accessory to the computer, to permit direct manual control of the motors actuating the light source and transparency movements in event of failure of the computer to satisfactorily perform.

Studies of the projection problem revealed that the projector light source and transparency units must be so positioned relative to the pilot location that his normal field of vision is not disturbed, and that he should be provided with a horizontal angular projected scenery coverage substantially greater than 180°. Furthermore, the level of illumination should be adequate for simulation of flying by daylight, and the apparent distance between the cockpit and the terrain simulation on the screen should be as great as practicable.

Obviously, the scenery presentation on the screen must be in reasonably correct perspective when viewed from any point in the simulated flying area, and errors therein would not be tolerable if they created incorrect cues such as might condition the student pilot to subsequently fall into dangerous situations when in real flight. A study of the small diameter light source projecting method in this instance revealed that preferably a plurality of projector units would be employed. For example, at least one light source and transparency of vertical wall form would be employed for projecting simultations of distant scenery and horizon references; while one or more vertically spaced units having transparencies of horizontal wall form would be employed for projecting, in proper perspective, the nearby as well as background and intermediate scenery simulations, as may be required for in connection with hovering and/or flight training activities at different altitudes. Since autorotative landing procedures start at altitudes of the order of 500 feet, and the learning of proper "hovering" techniques is most difficult when close to the ground and under 50 foot altitudes, the apparatus of the invention as illustrated herein includes a "main" or "hovering" projector and a supplementary "autorotation" projection unit, capable of proper simulations of the same terrain at their respective "altitudes."

Thus, as shown in the drawings herewith, and referring initially to Fig. 1 of the drawing, an over-all arrangement embodying the invention may comprise major components including "horizon," "main," and "autorotative" projectors indicated generally at $P_1$, $P_2$ and $P_3$, respectively; a student pilot cockpit designated generally at 26; a partispherical screen designated 27; a computer mechanism designated 28; and an instructor's station designated 29. The instructor's station includes a manual control board for manual introduction by the instructor of "external" influences, resulting in computer output impulses actuating the motors controlling the projectors so as to modify the simulated scene on the screen, whereby the student may be trained to counteract external flight disturbing influences, such as wind gusts, uncalled-for engine speed changes, or the like.

The primary input signals to the computer are functions of movements of the pilot controls in the cockpit. Thus, the computer introduces these control position signals, along with various preset data indicating changes in wind velocity and direction, loading conditions, air temperature, etc., into the flight equations for the type helicopter for which the student is being trained, and produces output signals corresponding to the motions such helicopter would experience when subjected to similar control activity. More specifically, these output signals control the six motions of the projection system, as will be explained in more detail hereinafter. In addition, signals are provided to produce various engine noise simulations, air frame vibrations, landing shocks, and instrument indications, as will also be discussed more fully hereinafter.

As hereinabove stated, the apparatus of the present invention employs the point light source visual display principle to provide a true perspective image of a given terrain according to any aspect from which the terrain may be viewed. The operative principle is that light emanating from a very small, intense source, casts a sharp shadow or a colored image of an opaque translucent and/or transparent object in its path. Hence, a suitable transparency comprising, for example, an aerial photograph transparency or a painted miniature or a setting of three dimensional models is arranged to substantially surround a suitable light source and to thereby cast shadows and/or images of the transparency configurations onto a screen to be viewed by the student pilot. Two general types of transparencies have been considered for the purpose of producing the effect of scenery simulations on the screen; rigid plates of glass or plastic or other suitable transparent material, and flexible transparencies adapted to roll upon and travel between suitable rolls or sprockets, as in the motion picture art.

For some phases of the problem of the present invention the first type appears to possess definite practical advantages, while the second method appears to possess other advantages, useful in connection with other phases of the problem. For example, the second method will obviously provide a considerably greater flying area; but for hovering training, where a limited area is quite adequate, the rigid plate method is probably preferable because it permits a simpler projector construction and provides a greater latitude in a scenery selection. Several systems for coincident horizon and ground scenery projections have also been considered; and as illustrated herein the preferred system includes a revolving drum (projector) P–1 which projects the horizon simulations which appear at all times to remain in the far distance (that is; they are unchanged in size) regardless of direction and duration of flight.

The main or foreground projector, however, is essentially a dish-shaped box of transparent bottom and side wall form, and is rotated about three axes and moved in translation in two transverse directions about its light source which is horizontally fixed. The images projected from this transparency may be either conventionalized configurations painted or otherwise applied to the bottom and wall spaces, or may constitute appropriate portions of actual aerial photographs. Rotation of the entire assembly will of course create the effect of change of heading, and vertical movements of the light source relative to the projector transparency will provide appropriate illusions of change of altitude. Variations in relative speeds of the motions of the transparency and the light source components produces the illusion of change of apparent motion with respect to the ground. Through use of such an arrangement surprising realism of scenery simulation, even in connection with apparently low altitude flight, is readily attainable; and objects appearing in the middle foreground and further distance appear to increase in size as the student "flies" toward them. Correction of the heights of the horizon simulation to compensate for displacements of the transparencies is effected by automatic vertical adjustments of the horizon projector light source relative to its transparency.

Many of the basic principles, as well as the constructional details, of this projection system can best be considered in terms of the geometry of the system. Although the system is three dimensional, its geometry can be studied by means of a two-dimensional cross section, taken along the longitudinal axis of the device. This is because, with minor exceptions, the plane obtained along this cross section is the same as any vertical plane which intercepts the vertical axis of the trainer, passing through the light source and the pilot's eye. The exceptions, involving principally the displacement of the horizon projector along the longitudinal axis and the displacement of the pilot's eye along the lateral axis because of use of a two-place cockpit, do not have important effects.

At the outset, the basic relationship between light source, observer's eye, and screen should be considered. If it were possible to place the observer's eye exactly at the point source of light, the observer would see in proper perspective all of the terrain represented on a flat transparency, regardless of screen location. Since this obviously is not possible, minor errors in perspective are introduced, and it is therefore important that they be recognized and kept to a minimum. The principal error introduced is because of a tendency of a given point of scenery to appear somewhat higher on the screen than it should appear when viewed from the light source. The amount of this error is a function of the distance between the observer's eye and the light source and of the distance to the screen from the observer. The error can be held to an unimportant amount by placing the eye as close to the light as is practical, and by maintaining a relatively large screen radius.

Figures 2–3 are schematic representations of the basic geometry of the system. Point A represents the location of the pilot's eye (neglecting lateral displacement). Point $L_1$ shows the point source of light of the main projector P–2 in a normal flying position at the center of the plate. Point $L_2$ shows the same light "on the ground" at the center of the plate. Point $L_3$ shows the light at maximum altitude. The solid line P–2A shows the transparency plate in its centered position. The broken line P–2B shows the plate in its extreme aft position; representative of the helicopter being in the extreme forward position, and broken line P–2C shows the plate in the extreme forward position representative of the helicopter in the extreme aft position.

The horizontal projector P–1 is composed principally of a non-moving light source K and a cylindrical transparency T. The transparency T rotates in yaw about the axis VV when the main projector plate yaws about its axis ZZ. The forward displacement B of the horizon light K compensates for the displacement R of the axis VV from the axis ZZ along the longitudinal axis of the system, in order that the projected scenery from both projectors will remain in synchronization during yawing.

Point $H_1$ on the transparency T represents an horizon point on the distant scenery, and Point $H_2$ is its projected image. This point may represent a hilltop, for example, below which may be indicated distant scenery and above which sky effects may be simulated. With the main plate P2 in position P–2A and the light at altitude $L_1$, Point $J_1$ on the screen is the projection of Point $D_1$ on the vertical end section of the terrain plate P2. Likewise Point $J_2$ is the projection of Point $D_2$, which is the intersection of the vertical and horizontal sections of the terrain plate P2. Point E is the extremity of the hood or shield over the pilot's head; the purpose of which is to prevent the pilot from looking directly up into the plate P2 and the lights. Point M is the projection of Point E.

Under conditions as shown, the pilot will see the near scenery of the flying field as projected from M upward to $J_2$. Simulations of trees at the end of the field are projected from $J_2$ upward to $J_1$. The distant scenery behind the near-forest appears between $J_1$ and $H_2$, the sky simulation is above $H_2$.

Point $N_1$ on the horizon transparency represents the extreme lower transmission limit of this transparency. Its projected image is point $N_2$ and in the condition shown in Figure 2 the distance between $J_1$ and $N_2$ receives projection from both light sources L and K. This apparent overlapping of projected material from the two light sources can be handled either by using mechanically operated shields, or "choppers"; or by "overprojecting" one scene over the other with a greater intensity of light. The latter method is now considered preferable, and its success depends on the principle that when scenery from two light sources is projected onto the same screen area, if one is substantially brighter than the other, only the brighter picture will be visible.

Since no available lamp of suitable characteristics would provide a usable angular coverage of more than about 120°, it is planned to supplement this basic arc lamp with two small "side" lights. This arrangement is indicated schematically in Figure 3. The successful utilization of these supplementary lamps depends on the principle that with proper shielding of the extremity of the cone projected by each lamp an almost unnoticeable blending zone can be obtained. These additional lights will be miniature filament lamps and will thus not produce the sharpness of image that is obtained with the arc lamp. However, experimentation with the full scale model of the projection system has indicated that neither this somewhat decreased sharpness nor the zone of merging itself will create serious detrimental effects on the illusion. It should be noted that with proper shielding between front and side lights a sharp line of demarcation can be obtained; however, such a line seems to be more noticeable than an overlapping zone in which two images of a given object on the plate are projected.

*Projector motions*

All of the apparent motions of the helicopter are incorporated in the projector motions. These motions are as follows: North and East components of horizontal translation in the terrain plate P2; yaw about the vertical axis ZZ; altitude change by varying the height of the lamp above the plate; and roll and pitch about axes XX and YY passing through the point 0. These projector motions will provide the appearance of scenery changes corresponding to what would be seen from the helicopter under similar conditions. The only potential source of error introduced through these motions concerns the locations of the pitch and roll axes because the entire projector system, including the main and horizontal projectors, pitches and rolls appropriately around these two axes. In the real helicopter, the pitch and roll motions occur about the center of gravity of the aircraft, which usually is located somewhat below and aft of the pilot's head. Therefore in the design of this mechanism it is assumed that the projector P2 should ideally pitch and roll about such a point.

However, studies indicated that the use of correct axes would create major problems both in mechanical design and in power requirements. These problems appeared to be considerably simplified if axes above the transparency plate rather than below it could be used. A geometric analysis of the errors introduced by such a shift in axes indicated that the resultant apparent motions would still be always in the right direction, and that the magnitude of the errors would be small. In fact when the full scale model of the projection system was built, such distorted axes were included, and no distortions of the projected scenery, when rolled and pitched, were noticeable.

It should be noted that because of the displacement between the light source $L_1$ and the observer's eye, the visual horizon is somewhat above the actual horizontal plane through the pilot's eyes. Thus the raising of the pitch and roll axes above the technically correct location relative to the pilot is actually in the right direction, since it tends to place any apparent points of rotation in roll and pitch in the approximately correct location in the scenery, as projected.

Obviously, one of the first important considerations in planning point source projector combinations of light, transparency, and screen, is to establish the basic geometry of the system in terms of a particular problem to be simulated. The first step in this process, assuming an essentially flat transparency through which the image is projected in approximately correct perspective, is to establish the minimum distance between the transparency surface and the center of the light source and transparency objects which represents the point below which the clarity of the picture deteriorates markedly. For example, an "on the ground" position of the light source of approximately 0.66 inch above the plate may be established since the light source to be used tends to produce a "fuzzy" image at lesser distances. A second consideration is the physical size of the light source involved. Its envelope must not touch the transparency before the minimum distance previously referred to is reached.

Once the minimum plate-to-light source distance has been established, this dimension should then be equated to the minimum altitude for the particular problem; and the resulting ratio is the basic scale for the transparency. In applications where it is desired to simulate either landings or approaches very near to the ground, and also to be capable of "flying" at substantial altitudes and over substantial distances, the requirements for the high and low altitude conditions tend to become incompatible. This tendency suggests, for the autorotation phase, the use of two separate projectors; one for high altitudes and greater distances and the other for low altitudes and covering a comparatively short flying distance, with means for shifting between the two projectors at a predetermined altitude. This incompatibility is particularly important in the case of scenery which must be viewed for training reasons as a complete entity, rather than more generalized terrain which can be apparently "unrolled" from under more or less stationary distance scenery.

The selection of a scale for a particular problem or part of a problem depends largely on the type of scenery to be depicted; what types of cues must be presented to the pilot; the total range to be covered; and the maximum and minimum altitudes. For example, in the helicopter hovering application, a scale of 130 to 1, with only 500–600 feet flying distance available was selected because the principal visual requirement is a presentation of a number of large scale detailed objects. In this case, there is no real need for providing a large flying area. On the other hand, where a large flying range is necessary but there is no landing requirement, a scale of around 2,400 to 1 could probably be used to advantage.

Generally speaking, the smaller the scale (i.e. the greater the area covered per square foot of transparency) the better; in order to make the most efficient use of a given projector or transparency size. However, since existing light sources have placed a practical limitation on the extent to which the scale may be reduced, it becomes all important when considering extended uses of the point source technique, that the source itself be made as small as possible with a proportionally small surrounding envelope in order to permit a clear image at minimum plate-to-light distance.

It is contemplated to employ the use of deliberate distortion of one or more scales where such distortion will permit simpler mechanical arrangements without creating unsatisfactory cues. Such distortions may even be advantageous in some instances. For example, recognition of a particular landmark under subdued lighting conditions might actually be enhanced for example, by a four to one increase of the vertical plate scale, and at the same time simplify manufacture of the transparency.

*Combinations of projectors*

Each application of the point-source system will generally require a combination of two or more light-and-transparency assemblies in order to adequately present a complete visual display; including sky and horizon effects, distant scenery, and the near terrain in correct perspective. As has previously been mentioned the device illustrated herein involves three such projectors: a horizon or sky-projector $P_1$; an optional "autorotative" projector $P_3$; and a main terrain or "hovering" projector $P_2$. In this device, although the horizon projector is illuminated at all times, only one of the terrain projectors is operative at any given time for scenery projection. At a predetermined simulated altitude the scenery projection is shifted from one terrain projector to the other. It is preferred that the projectors be located as close as possible to each other; that the color and texture of the terrain depicted by the two terrain projectors be matched as closely as possible; and that certain geometric corrections be made in the miniature scenery settings to at least partially compensate for the positional displacements between the two light sources.

Specifically the projection system as illustrated herein incorporates three projectors: a hovering projector containing two and three dimensional objects to display simulations of terrain from touchdown to 55 feet of altitude; an autorotation terrain projector containing two and three dimensional objects for use from 55 to 500 feet of altitude; and a horizon projector to supply the sky simulation effects. Both terrain projectors possess three translational and three attitude degrees of freedom to provide unrestricted flight motion simulations. The information from these projectors is presented on a reflective screen through 270 degrees in azimuth and 75 degrees elevation, as measured from the pilot's position.

As illustrated in Fig. 4 of the drawing herewith, the "hovering" projector mechanism is so arranged that the projection transparency is free to move in five separate senses; i.e.; angularly about pitch, roll, and yaw axes, and translationally in two transverse horizontal directions; while the light source is arranged to be vertically translational relative to the transparency. Hence, this picture projection system possesses six degrees of adjustment freedom. Fig. 4 illustrates schematically a mechanical system for obtaining the aforesaid degrees of freedom, and some of the drive motors which are operable to adjust the mechanism in response to commands from either the manual control station or the analog computer, as will be explained hereinafter. Figs. 6–13 illustrate an exemplary physical embodiment of the transparency and light source constructional and mounting and control features.

Thus, as shown in Fig. 4 of the drawing herewith, a typical projection unit comprising a horizon projector $P_1$ and a main or foreground terrain projector $P_2$ may be arranged to be suspended above the position of the student pilot (as illustrated in Fig. 1) by means of any suitable framing indicated fragmentically at 30—30. The mounting structure includes a gimbal (or other suitable universal joint type support) as indicated at 31 which pivots on "pitch" axles 32—32 and carries a "roll" axle 33 from which depends a relatively rotatable two piece support post 34—35, the lower end of which carries a rigidly mounted housing 36. By means of transverse slideways 37—37 the housing 36 carries therebelow an intermediate frame 38 which in turn slidably mounts as indicated at 39—39 the main terrain transparency designated 40. Hence, the transparency 40 is translationally movable relative to the housing 36 in transverse directions as indicated by the NS—EW directional lines accompanying the figure. One of the axles 32 of the gimbal device is operatively connected, as by means of a cam and gear arrangement 42 to the pitch axis control motor 44; and a similar arrangement 46 connects the other shaft of the gimbal mechanism to the roll control motor 47 for controlling "roll" in the unit.

The support tube 35 is driven to rotate about the post 34 by means of a yaw drive motor 48 and a gear mechanism 49; whereby it will be appreciated that in response to operation of the pitch control motor 44 the entire projector assembly will pivot about a "pitch" axis extending horizontally transversely of the student pilot heading when seated in the cockpit; while operation of the roll control motor will cause the mechanism to swing upon the "roll" axis which is approximately in line with the cockpit; and operation of the yaw control motor will cause the projector transparency to rotate about a vertical axis simulating yawing deviations relative to the heading of the cockpit.

A pulley-cable system as illustrated in Figs. 9–11 is arranged to be driven by motors for moving the transparency 40 in NS and EW directions relative to the housing 36. The light source is indicated at 60 and is mounted upon the lower end of a tube 62 which is mounted in free sliding relation in the main support tubes 34—35. A motor as indicated at 64 is geared to the upper end of tube 62, and thus upon operation of the motor 64 the lamp 60 will be raised or lowered relative to the transparency 40 to produce the illusion of altitude changes; while operations of the motors shifting the transparency horizontally produce illusions of horizontal flight motions in fore-aft and lateral directions. As indicated at 70, the transparency element of the horizon projector $P_1$ is of cylindrical wall form and mounted by means of a vertical central shaft 72 supported by an arm 73 extending from the main dependent shaft 34. Yawing of the transparency 70 in synchronism with yawing of the main transparency 40 is readily obtained by means of a chain-pulley system as indicated at 75.

Designing a practicable physical embodiment of the projector suspension system presents many problems involving requisite ranges of travel, loadings, avoidance of interferences between relatively moving parts, and the like; and a machine satisfactorily exemplifying the invention may be constructed as shown in the drawing at Figs. 6–13, which will now be described in detail. As shown in better detail in Figs. 6, 7, 8, the projection mechanism thereof is suspended by means of a rigid structural framework comprising vertical posts 80 mounting rails 82—82 in parallel relation at positions fore and aft of the mechanism. A pair of longitudinal sills 84—84 are supported upon rails 82—82 to extend above and alongside the fore and aft longitudinal axis of the mechanism. Four drop beams as indicated at 86 extend downwardly from the sills 84—84 and support at opposite sides of the machine a pair of cross beams 88—88 carrying trunnion bearings 89—89 supporting a pair of aligned stub shafts 90—90 defining the pitch adjustment axis of the mechanism. A generally rectangularly shaped and open center yoke 92 is thus supported by the stub shafts 90—90 on the stationary frame structure, so as to be free to pivot about the "pitch" axis defined by the shafts 90—90. Control of the pitching motion of the yoke 92 relative to the stationary frame is obtained by means of a motor 95 which drives a worm gear as indicated at 96 to in turn rotate a shaft 97 driving a crank 98, which in turn operates through a rock shaft 99 (Fig. 8) driving a second crank 100 and push-pull rod 101 which pivotally connects to the yoke 92. Thus, the yoke 92 is caused to rock upon the shaft 90—90 in response to operations of the motor 95.

The yoke 92 mounts interiorly thereof a pair of stub shafts 102—102 disposed in mutual alignment and at right angles to the axes of the shafts 90—90 but in the same horizontal plane thereof. A block 104 is carried by the shafts 102—102 and is thereby free to rock relative to the yoke 92 about an axis extending horizontally and on the "roll" axis of the mechanism. As indicated at 106 a worm gear is fixed to the yoke 92 and is arranged with its output drive shaft coupled to the block 104 through means of one of the stub shafts 102; a motor 108 being in turn coupled to the gear 106 for driving the latter to cause the block 104 to rotate upon its shafts 102—102 relative to the yoke 92 about the "roll" axis of the mechanism.

A stub shaft 109 depends integrally from the block 104 and carries thereon a transparency mounting housing 110 in such manner that the housing 110 is compelled to swing with the block 104 incidental to any pitch or roll adjusting motions thereof, while at the same time the housing 110 is freely rotatable about the vertical axis of the stub shaft 109. A gear case as indicated 112 carrying a driving motor 114 is mounted upon the block 104 and is so arranged as to drive a worm gear 115 which is carried by the housing 110; whereupon operation of the motor 114 will cause the housing 110 to rotate about the vertical axis of the depending stub shaft 109. Hence, it will be appreciated that the housing 110 is mounted to possess three degrees of freedom of angular motion, about the simulated pitch, roll, and yaw axes of the mechanism; and that such motions of the housing 110 may be independently obtained by appropriate reverse direction operations of the motors 95, 108, 114 respectively.

Figure 12:
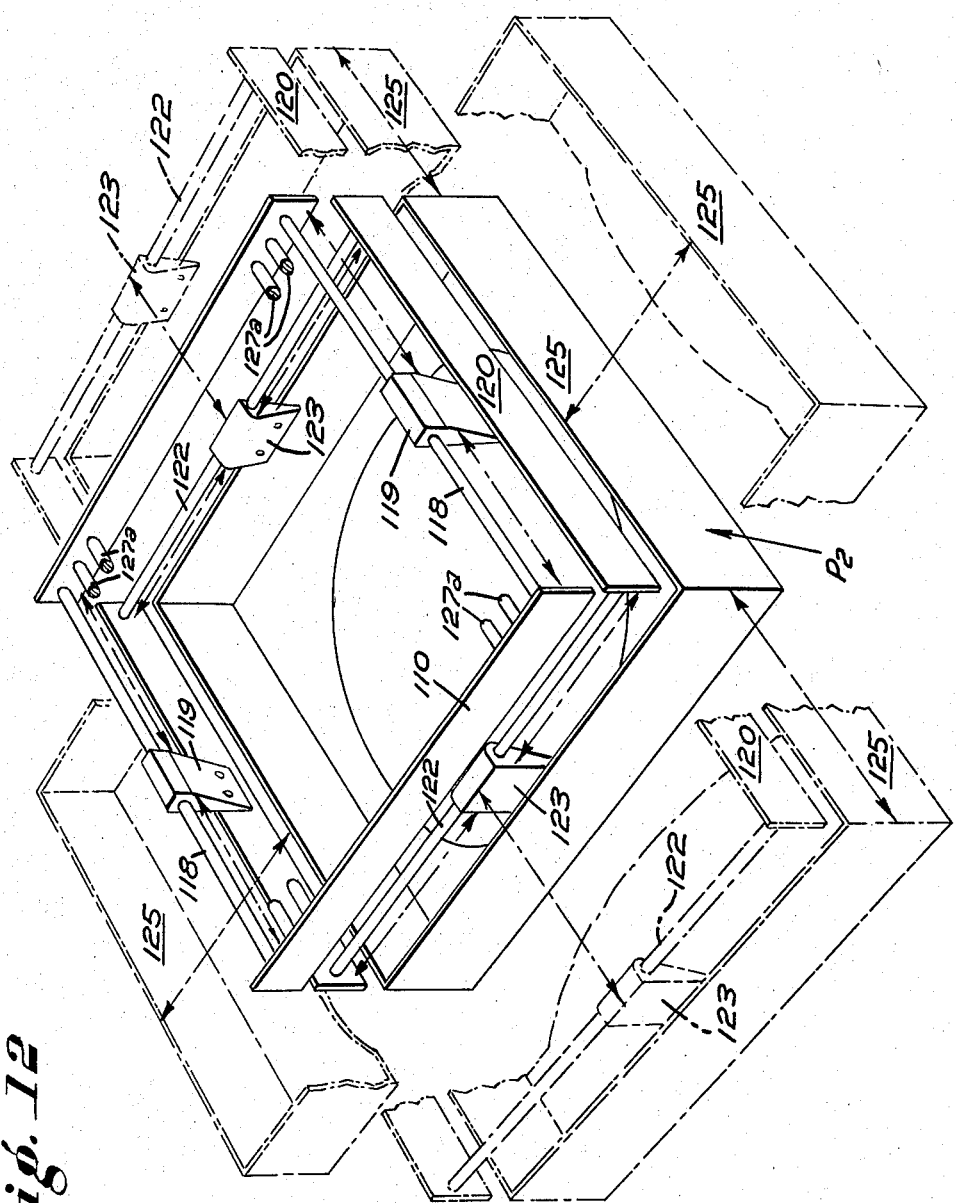
Fig. 12 is a perspective view, partly schematic, illustrating the mode of translational shifting of the main projector transparency component of the mechanism, in various positions of adjustment.

The housing 110 mounts by means of horizontal paired slide rails 118—118 and slide bearing brackets 119—119 an intermediate frame 120 which in turn carries opposed slide bars 122 running in directions at right angles to the directions of the bars 118. Slide brackets 123 extending rigidly from the main projector transparency designated 125 travel on the bars 122—122. Thus, as shown in Fig. 12, the transparency 125 is mounted to be free to be moved in translation in directions both fore and aft and sidewise relative to the mounting of the transparency support upon the gimbal mechanism hereinabove described. Power means for controlling the position of the transparency 125 relative to the vertical central axis of the housing 110 may of course be of any suitable form; but as illustrated herein the system comprises a cable and pulley system operated by electrical motors.

For example, movements of the intermediate frame 120 in directions parallel to the NS directions as indicated in Fig. 11, are obtained by means of a motor 126 through a dual cable and pulley system as indicated at 126a. The cables 126a—126a train around the drum of the motor 126 and are fixed to the brackets 119—119 as indicated at 126b—126b. Static balance of the frame 120 relative to the gimbal mount is retained by shifting counterweights 127—127 which ride on slide bars 127a—127a and are driven by cables 127b—127b tied to the brackets 119—119 at points 126b—126b and training around idler pulleys 127c—127c. The transparency support brackets 123—123 are driven to move laterally relative to the frame 120 by means of a motor 128 driving a dual cable system 128a—128a so designed that the motor 128 may be mounted on the housing 110 while driving the transparency 125 without interferences by NS motions of the frame 120.

Thus it will be appreciated that the transparency 125 is thereby supported to be suspended in generally flatwise attitude below the gimbal support mechanism so as to be freely swung in directions simulating pitch, roll, and yaw attitude changes, while being also free to be moved translationally in fore and aft or transverse directions; and that the various motions of the mechanisms hereinabove referred to may be readily provided by appropriate control of the motors referred to. The transparency 125 comprises generally an open top boxlike formation wherein the bottom and sidewall portions thereof are formed of some suitable transparent material, such as "Plexiglas," "Lucite"' or other suitable plastic, or true glass, or the like; and upon which are painted or printed or otherwise imposed miniature simulations of scenery. For example, as explained hereinabove, the terrain simulation devices may be provided by means of aerial photographs, or may be purely imaginative typical scenery objects as normally encountered during helicopter flight operations.

The point light source element of the construction as illustrated in Figs. 3, 5–8 comprises of course only one presently preferred form of point light source mechanism, and as illustrated herein includes a main light supply lamp 130 of the arc lamp type bracketed by a pair of smaller side lamps 132—132 of the incandescent filament type; the complete lamp assembly being carried upon a bracket 134 (Fig. 13). The side lamps 132—132 are adjustable as to height relative to bracket 134 as indicated at 135. The lamp carrying bracket is mounted upon the lower end of a tube 136 which telescopically fits within the centrally bored suspension shaft 109.

A gear 138 carried by a shaft 139 and driven by a motor 140, as through means of a worm gear drive 142; the gear 138 being arranged to mesh with a vertically toothed rack formation 144 on the side of the lamp carrying tube 136. Thus, operation of the motor 140 will cause the tube 136 to either raise or lower relative to the block 104 and to the transparency 125 which is supported thereby. Consequently operations of the motor 140 will cause the light source lamp unit to be raised or lowered relative to the indicia of the transparency, to give the illusion of altitude changes incidental to simulated helicopter flight operations. For cooling the lamp unit, the tube 136 may conveniently be provided at its upper end with a blower as indicated at 146 driven by an electric motor and arranged to discharge cooling air downwardly through the tube 136 against the lamp bulbs. Also, the power supply wiring for the lamps may be conveniently carried through the tubing 136, and thence through a connector 152 and thence through the lamp terminal leads as indicated at 154.

As illustrated in Figs. 6, 7, 8, the upper or "horizon" transparency projector is conveniently carried by one of the gimbal block axles 102 to extend forwardly therefrom, by means of a mounting bracket 160. The projector includes a cylindrically shaped transparency 162 carrying indicia as explained hereinabove and adapted to rotate upon a spindle 164 carried by the bracket 160. The spindle 164 is arranged to be driven by means of a chain and sprocket mechanism as indicated at 166 engaging a sprocket 168 carried by the main housing support shaft 109; the sprocket devices being so arranged as to cause the transparency drum 162 to rotate in synchronism with rotations of the main transparency 125 about its vertical central axis as explained hereinabove.

As previously discussed, the transparency 162 will preferably carry cloud and horizon simulating indicia to be projected against the upper reaches of the screen 27 above the effective level of the scenery projections of the main transparency 125. Because the bracket mounting the transparency 162 extends directly from an extension of the roll axis shaft 102, the transparency 162 pitches and rolls directly with the main transparency, and "yaws" in synchronism therewith. The light source for the transparency 162 is indicated at 170; and it will of course be appreciated that the light source may be of any suitable type such as for example the type illustrated and described hereinabove in connection with the main transparency.

As explained hereinabove, whenever the mechanism is to be employed in teaching the art in autorotative landings, another horizontally disposed transparency, supplemental to the main transparency 125, is preferably employed such as indicated in the drawing generally at P3 and more specifically at 175 in Figs. 14–21 inclusive. As shown in the drawing the transparency 175 may be conveniently mounted to extend from the main mount housing 110 by means of a connecting arm 176 to which is attached a crooked post 177. At its bottom end the post 177 mounts flanges 178—178 and a vertical adjustment plate 179 to which is bolted the transparency base frame 180. The base frame 180 is thus supported rigidly in the attitude shown in Figs. 14–15 relative to the main transparency 125.

The base frame 180 mounts in laterally slidable relation thereon a carriage plate 182 by means of a laterally disposed horizontal slide bar 184 and a guide roller and track system as indicated at 186 (Figs. 16, 18, 19). The carriage 182 mounts in cantilever extending relation therefrom a support bar as indicated at 188 which carries at its forward end an inverted T-shaped bracket 189 carrying a vertical support shaft 190 from the top end of which extends a cross bar 191 which fastens at its ends to the structural framework 192 for the transparency 175.

The transparency frame 192 is activated to move longitudinally toward and away from its mounting construction, by means of an elongate screw indicated at 202 which engages a threaded nut 204 fixed to the bracket 189, and driven by means of a gear system 206 by a motor 208 (Fig. 16); whereby it will be appreciated that the transparency is adjustable toward and away from its mounting base upon operation of the motor 208. Lateral motions of the carriage 182 relative to the base plate 180 are accomplished by means of an elongate screw 216 (Fig. 18) which threadedly engages a driving nut 218 and is driven through means of a gear train 220 by a motor 225. Thus, it will be appreciated that whereas the transparency 175 is carried below the transparency 125 to move generally therewith upon attitude adjustments of the latter (as illustrated schematically in Fig. 15) the lower transparency 175 is independently adjustable upon its mounting both vertically and horizontally in two directions; whereby the system may incorporate the various terrain projection features discussed hereinabove.

The light source for the transparency 175 is indicated at 230 and is carried by means of a positionally adjustable bracket 232 upon the end of a support tube 234. The support tube 234 is mounted to extend in cantilever fashion from a bracket 236 carried by a threaded nut 238 which mounts upon a vertical screw 240 journaled by means of suitable brackets 242—243 which are supported upon the stationary base frame 180. A stabilizer guide bar as indicated at 246 is also mounted to extend vertically from the stationary base frame 180 and guides the support tube bracket 236, so as to stabilize the tube 234 in forwardly extending attitude while being at the same time vertically shiftable relative to the base frame. The screw 240 is driven by means of a gear system indicated generally at 248 which in turn is driven by a reverse direction motor 250.

Thus, it will be appreciated that reverse direction operations of the motor 250 will cause the light source 230 to raise or lower relative to the transparency 175, thereby providing illusions representative of altitude changes in the simulated flight. As indicated at 256, the power supply conductors to the lamp source 230 are conveniently threaded from the bracket 232 along side the support tube 234 and thence carried by the support beam 177, as indicated at 256. For cooling the lamp 230, a blower as indicated at 260 is conveniently mounted upon the support beam 177 and is arranged to discharge through a flexible tube 262 into the rigid lamp carrying tube 234 and discharges the air from the blower onto the lamps 230. The lamp bracket 232 is conveniently supported relative to the transparency 175 by means of a roller or the like as indicated at 266; thereby precluding the possibility that the intensely hot lamp may come in direct contact with the transparency wall material, while permitting the lamp to be brought into the closest possible proximity thereto. As indicated at 268 (Figs. 20–21), shielding may be applied to the side lamps of the light source unit to control the light path projections from the light source, as discussed more fully hereinabove.

As indicated at 270 a potentiometer is employed to provide a positional signal of the lateral motion of the carriage 182; the signal being transmitted to the manual control station and thence to the flight computer which in turn commands the amplidyne station to control the hovering projector to maintain lateral position correspondence between the two projectors during "autorotation" descents. Potentiometer 271 performs a similar function in relation to longitudinal movements of the transparency 175. Switches 272, 273, 274, 275 are provided to establish preset positions by the three translational projector mechanisms, thereby insuring correct initiation of an autorotation descent simulation.

The cockpit and cockpit equipment

The second major component of the device is the student cockpit, which must provide the "pilot" with realistic simulations of an actual helicopter cockpit. The principal function of the cockpit is to provide to the student pilot realistic control implements, instruments, adequate view of the projected scenery, and artificial vibrations and noises simulating those associated with normal helicopter flight.

If an actual helicopter cockpit is used the plastic "bubble" surrounding the cockpit will preferably be removed, in order to avoid optical interferences with the projection, and also to avoid mechanical interferences between the bubble and the terrain projector plates. All of the usual flight controls in the cockpit will be employed and rendered operative to reflect the usual operational friction adjustments as well as the "irreversibles" in the lateral and longitudinal cyclic systems. Each control system will of course be coupled to means to provide an electrical signal for the computer corresponding to the amount of each control movement. Thus for example as illustrated in Figs. 1 and 23 the cockpit may typically include rudder pedals as indicated at 300; a cyclic control lever 302; a collective pitch control lever 304; and a engine throttle control as indicated at 306. In Fig. 23, the cyclic and collective pitch control levers are illustrated as being operatively connected to push pull members 308, 309 and 310, respectively, which in turn variably adjust potentiometers as indicated at 312, 313 and 314 controlling the potentials between the conductor systems indicated at 316, 317 and 318, respectively. The throttle control handle 306 is operatively connected through means of a gear system as indicated at 319 to a rack and pinion device 320 which in turn adjustably controls a potentiometer 322 controlling the potential between the conductor system 324; the rudder pedals 300 are similarly operatively connected to adjust a potentiometer 325 controlling potential between conductor system 326; the conductors 316, 317, 318, 324, 326 being arranged to supply input signals to the computer component of the arrangement, as well be explained more fully hereinafter.

Simulations of appropriate rotor vibrations will preferably be introduced as explained hereinafter into both cyclic control systems; and in addition, the cockpit itself will preferably be vibrated to simulate the effects of both main rotor and tail rotor speed changes.

It is of course important that the cockpit be so located that the pilot may see the projected scenery without interfering shadows. Therefore the projectors must be so arranged that none of their parts will cast a visible shadow from either of the light sources upon the screen. Likewise, there should be no visible shadows of the instrument column or other cockpit equipment upon the screen. Preferably a small hood or shield is placed directly over the head of the pilot so that he will not be able to look directly up into the light and also so that shadows of the cockpit will not be projected with the scenery (see Fig. 2).

The following instruments will preferably be supplied in the cockpit as indicated at 328 (Fig. 1) with duplications thereof at the instructor's station: manifold pressure gauge, dual tachometers, air speed indicator, altimeter, and compass. Investigation of the effects of engine and rotor sounds on helicopter pilots revealed that a trained pilot can detect small changes in engine and rotor r.p.m. by ear without reference to his tachometer. Hence, the inclusion of a sound simulation device is considered necessary to provide the student pilot with a realistic background. Tape recordings of typical sounds in the cockpit of a helicopter in flight might be employed, but investigation indicated that such a procedure would probably be quite costly in equipment and would probably provide a greater degree of realism than necessary for training purposes. For example, a simple circuit built around a neon tube relaxation oscillator and a commercial amplifier will produce sounds which are believed to be adequate. If, however, an extremely realistic simulation is desired, the oscillator circuits can be replaced with a tape recording equipment.

The only kinesthetic effects believed to be necessary for inclusion in the cockpit are simulations of vibrations normally present in the helicopter, and of landing shocks. Landing shock effects are considered important since one of the vital phases of pilot training in hovering is precision-hovering at altitudes of one foot or less. Accurate hovering at this low altitude is much more difficult than at higher altitudes, and functionally the more important technique to acquire since almost no horizontal motion can be tolerated if a proper landing is to be made. Since the amount of landing shock, both laterally and vertically, is determined largely by the pilot proficiency in hovering which immediately preceded the landing, an accurate indication of landing shock is an effective "score" or evaluation of hovering proficiency. Therefore in the mechanism of the invention the helicopter cockpit is mounted upon its usual pneumatic tire landing gear, and variable "jolts," both lateral and vertical, are provided by means of solenoids, or equivalent mechanisms, commensurate with the accuracy of the "piloting." The solenoid operations are controlled by computer indications of lateral drift and vertical velocities at time of touchdown. For example, a suitable mechanism for simulating landing shocks to the fuselage may take the form as fragmentarily illustrated in Fig. 22 of the drawing herewith wherein the numeral 330 designates the floor or horizontal supporting structure for the helicopter fuselage or cockpit. A shock transmitting bracket as indicated at 332 is bolted or otherwise firmly affixed to the base 330 and carries the solenoid stator winding indicated at 334. The armature of the solenoid is indicated at 335 and connects as indicated at 336 to one end of the shock transmitting chain 338; the other end of which is attached as indicated at 339 to framing structure of the helicopter cockpit or fuselage as indicated 340 to impose shocks upon the fuselage in one horizontal direction. A similar mechanism is preferably connected to the frame 340 to supply motions therein in directions opposite to that of the mechanism illustrated. Still another solenoid may be arranged to act upon the frame 340 to move it in vertical directions; and thus it will be appreciated that these motions simulating typical landing reactions against the fuselage may be obtained upon appropriate control of the solenoids.

A typical electrical control system for the solenoid devices referred to hereinabove is also illustrated schematically in Fig. 22 as employing signals emanating from the computer which control the electrical energy applied to the respective solenoids. The output signals from the computer represent simulated velocities of the fuselage at the time of touchdown in vertical as well as horizontal directions, whereby a realistic landing shock effect will be obtained as a "score" of the student's landing ability.

Instructor's station

Whereas, it is probable that during hovering training courses the instructor will be in the cockpit with the student pilot only during the early phases of training, his presence will be required only intermittently during refresher practice courses later on in the training program. Also, because there are no instructor-controlled inputs requiring continuous attention, the location of the instructor's station is not critical. The station preferably consists of a panel mounting instruments indicating manifold pressure, engine r.p.m., air speed, altitude, and compass heading; and as well as means for introducing preset conditions such as wind velocity and direction, temperature, gross weight, CG position, and rough air. This panel is preferably designed as indicated at 342 for desk mounting and may be placed on an ordinary desk as indicated at 29 in Figure 1. This desk may be placed in such a position at the rear of the cockpit that the instructor can observe one side of the student pilot, and also the movements of the picture projected on the screen 27.

A mechanism for generating electrical inputs into the computer mechanism for simulation of random variable magnitude rough air or gust effects, is illustrated in Fig. 24 wherein a motor 370 is arranged to drive a gear train 371 which drives a series of four connecting rods designated 372. Two of the connecting rods are pivotally connected to opposite ends of a bar 373 which is pivotally attached at 374 to a walking beam 375. The other two connecting rods 372 similarly attached to opposite ends of a bar 376 which pivotally mounts as indicated at 377 upon the walking beam 375. The beam 375 is pivotally mounted as indicated at 378 to a slide rod 379 which is carried in a slide bracket 380 permitting motion of the rod in longitudinal directions. The rod 379 connects by means of a crank mechanism as indicated at 382—383 to drive the rotor of an air speed differential synchro 385.

An air speed signal generator as indicated at 386 (physically located in the computer) supplies output signals simulating the forward flight velocity, and feeds through the air speed differential synchro 385 to return an appropriate signal to the air speed indicator in the helicopter cockpit, as indicated at 387 (Fig. 24). However, upon adjustments of the crank system controlling the air speed differential synchro 385, the output signal therefrom will be modified by the magnitude of the displacement of the slide rod 379 which will be a function of the algebraic sum of all of the motions of the connecting rods 372. In like manner, through means of a connecting rod 388 and a crank system 389, the common control shaft of a multiple potentiometer unit designated 390 is rotated in random fashion corresponding to the longitudinal displacements of the slide rod 379 in response to random operations of the connecting rods 372 as explained hereinabove. The outputs from the potentiometers 390 are applied to the flight computer 28, and the effects thereof are thereupon imposed upon the servomechanism and are reflected in corresponding motions of the projector mechanisms simulating the effects of rough air encounters. The power inputs to the potentiometers 390 may be in turn varied by means of manual rotation of a potentiometer as indicated at 391 (which is physically located at the instructor's station) whereby the magnitudes of the variable gust effects can be regulated by the instructor to simulate the range between zero and extremely rough air conditions. As indicated at 392, an "off" switch is preferably provided in circuit with a relay 393 to disable the effects generated by the air speed differential synchro 385 and the potentiometers 390, to eliminate the complications of rough air conditions during the elementary phases of student training.

Manual control station

Because of the overall complexity of the computer mechanism and its functions as contemplated herein, it is believed preferable to provide direct manual control means which will permit control of the associated mechanisms independently of the computer. Thus, a manual control station as indicated at 345 is contemplated to permit manual operation of the servo systems as well as for providing a convenient location for starters and overload devices associated with the servo motors, and for location of miscellaneous equipment such as the sound generators and point source power supplies and the like.

The computer

The computer mechanism of the arrangement generates the helicopter dynamics, and comprises the central exchange means for mixing the effects of projector compensations, pilot's control motions, and instructor inputs.

The flight computer represents the helicopter aerodynamics and acts upon the pilot's control motions and initial flight conditions. The computer output then commands the projection system to provide motions that would occur in an actual helicopter with similar control displacements.

Three major types of computers for solving appropriate sets of helicopter flight equations, may be employed; i.e. mechanical, electronic, and electro-mechanical. However, the all-mechanical type would probably be of relatively high design cost and somewhat lacking in flexibility. All electronic units would appear to be entirely feasible and extremely flexible, but the cost of this type might also be high for prototype units. Consequently, it is believed that the electro-mechanical type is preferable because of its lower cost for the prototype unit; and because its performance is quite adequate for the purpose.

The function of the computer is to cause the projection system and accessory "cue" mechanisms to deliver optical and sensory outputs as a result of actuation of the pilot's and instructor's controls, that are substantially the same as those that would be produced by flight movements of the aircraft itself.

The primary inputs to the computer originate as mechanical motions of the pilot and instructor controls, which are sensed by potentiometers as illustrated in Fig. 23, or by synchros, or similar sensing devices. An analogue type computer is preferred for this purpose, and the computer must be capable of performing the operations of addition, subtraction, multiplication, division, integration and the generation of certain non-linear functions of variables. Computers capable of functioning in the required manner are disclosed for example in U.S. Patent No. 2,625,327.

For example, as illustrated in Figs. 1, 23, 25a, 25b, the control system is so arranged that fore-and-aft motions of the control column 302 upon its ball and socket connection will cause the potentiometer 312 to vary the signal in conductor system 316 to the analog flight computer 28 thereby providing a variation in the output signals to the amplidyne station, which in turn varies the electrical signals controlling the motors actuating the projector mechanisms. For example, if the lever 302 is pushed forwardly, the signals to the projector motors are so changed as to cause transparencies $P_1$, and $P_2$, and $P_3$ to pitch upwardly, thereby shifting the scenery projections on the screen 27 so as to provide the illusion of nose down pitching of the helicopter. Simultaneously, the projector transparency translational control motors are energized so as to shift the transparencies $P_2$ and $P_3$ to provide the illusion on the screen 27, of increased forward flight velocity, as well as a change in the vertical velocity.

The computer is so arranged as to simultaneously produce a change in the "engine rotor control voltage" issuing from the computer to the manual control station, wherein it produces changes in the rotor tachometer and engine tachometer outputs supplied to the instructor's station and thence to the appropriate cockpit instruments at panel 328. At the same time, this same change is reflected in the signals to the engine sound reproducers in the cockpit as indicated at 350 (Fig. 1); thereby providing to the student pilot an audible cue representing engine r.p.m. change. As an incident to the apparent change of indicated engine r.p.m. the output from the computer to the manual control station representing main rotor vibration is correspondingly varied so as to adjust the speed of the unbalanced mass type motor 355 (Fig. 1), thereby imposing upon the fulselage a change in the simulated engine vibration of the fuselage corresponding to the change in engine r.p.m. As a further incident to this control change, the indicated air speed output signal from the computer varies to adjust the air speed indicator at both of the cockpit panel 328 and at the instructor's station.

Similarly, reverse or rearward movement of the control column 302 will provide variations, in reverse sense in the control output of the computer so as to provide representation of opposite sense control effects. Lateral control motions of the lever 302 will similarly regulate the input to the computer so that the outputs therof will cause the optical presentations of the projectors and the accessory cues to represent corresponding reactions of a typical helicopter to similar control effects. In like manner manipulation of the collective control column 304, and of the throttle control lever 306, and of the rudder pedals 300 will be reflected in variations of the input signals to the computer, whereby the output signals to the corresponding optical and cue supply mechanisms will be adjusted to provide the illusion of changes in the helicopter flight corresponding to such manipulations of the aforesaid controls.

Figure 25B:
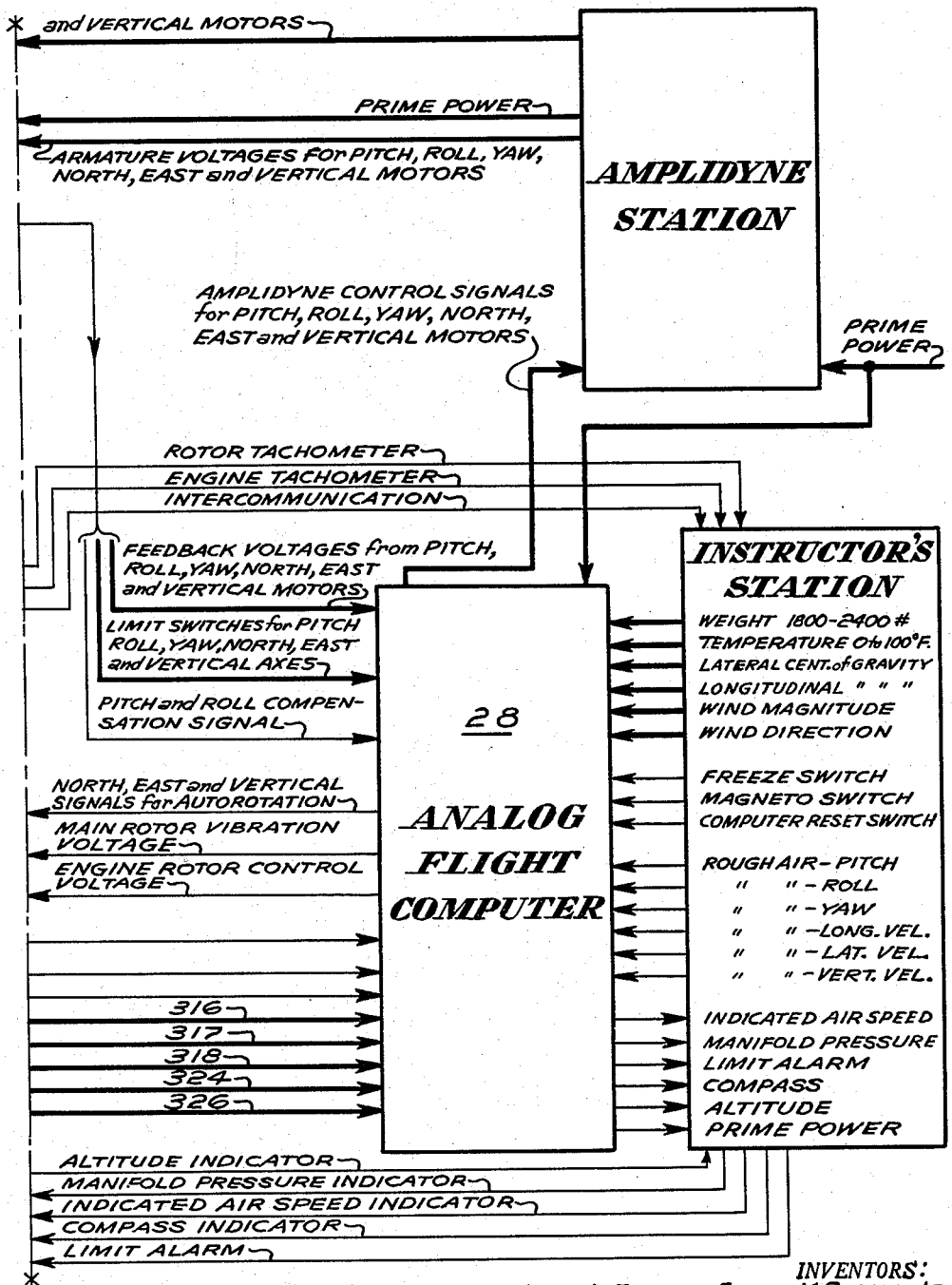

As illustrated in Fig. 25b, the instructor station may include any desired and/or typical control input devices such as listed thereon. For example, as indicated at the top of the list, the instructor station is provided with a manual control knob or lever which is manually adjustable so as to vary the simulated overall weight of the helicopter, from say 1800 to 2400 pounds. In like manner a temperature condition varying between zero to 100° F. may be arbitrarily set into the system by the instructor upon simple manipulation of an appropriate control knob or the like. Center of gravity shifts, wind direction and velocity changes, and rough air effects may be arbitrarily set into the system by the instructor.

Computer "freeze" switches and "reset" switches are provided in both the cockpit and at the instructor's station, which may be manually operable to either "freeze" or "reset" the computing mechanism to provide instructor aids in analyzing or explaining flight techniques. Also, a magneto switch control may be supplied as illustrated either in the instructor's station or in the cockpit, so as to permit simulations of engine failure, for training the student pilot in proper responses to such conditions.

Preferably, limit indication devices are provided in conjunction with the various motions available to the moving components of the projection mechanisms and the computer mechanisms. For example, as shown in Fig. 13, 360 designates a group of limit and stop switches which are activated upon attainment of the lamp adjustment mechanism at a predetermined position of adjustment thereof, such as represents the limits of travel of the mechanism. Upon activation of the switches, signals are sent to both the manual control station and to the analog flight computer where they are operative either to prohibit further travel of the mechanism in the direction which activated the switches, or to send alarm signals to both the cockpit and the instructor's station to give warning that the mechanism is reaching one or more limits of its operation.

As illustrated in the drawings, the projector mechanism motions are actuated by means of servomechanism devices. The mechanisms include tachometers and potentiometers which provide position and velocity information from the projector mechanisms through feed-back conductors to both the manual control station and the analog flight computer, thereby insuring precise following by the servo mechanisms of the commands issuing from the computer or from the manual control station. For example, as shown in Fig. 13, a tachometer as indicated at 361 is geared to the lamp adjustment system to provide velocity feed-back information to the computer. A potentiometer, such as indicated at 362 (Fig. 13), is also geared to the lamp moving mechanism to supply feedback information to the computer as to the height of the lamp relative to the transparency. Thus, these mechanisms insure that the motions of the lamp are in precise conformity with the commands of the computer or the manual control station.

By the way of further example, as shown in Fig. 18 of the drawing herewith, a potentiometer 365, a limit switch 366, and a tachometer integrally built into the motor 250, are all geared to the lamp height adjustment mechanism of the autorotation projector, and supply feedback information to the manual control station. These signals are then employed to insure that the autorotation lamp position is in precise correspondence with the commands issuing from the flight computer to the manual control station.

What is claimed is:

1. A helicopter flight simulator and pilot ground trainer comprising a stationary pilot cockpit, a picture projection unit disposed closely above the position of said cockpit, a picture receiving screen of fragmental spheroidal form extending in continuously curving form from in front of said cockpit around to opposite sides thereof and disposed substantially concentrically of said projection unit generally ahead of the cockpit, said projection unit comprising a plurality of transparencies having scene objectives thereon and a point light source disposed behind each of said transparencies for projecting light therethrough onto said screen, adjustment means for imparting to said transparencies tilting movements about pitch, roll, and yaw axes and translational movements in generally horizontal transverse directions, means mounting said light sources behind said transparencies so as to be vertically adjustable relative thereto, helicopter control simulating means in said cockpit and manually adjustable in simulation of helicopter flight control movements, an analog computer, means transmitting effects of adjustments of said controls to said computer, instructor control devices manipulatable to transmit external flight influence effects to said computer, and means operatively connecting the output phase of said computer to said transparency and light source adjustment means for actuating the latter in accord with variable outputs of said computer.

2. A helicopter flight simulator and pilot ground trainer comprising a picture projection unit, a picture receiving screen, said projection unit comprising a plurality of transparencies each having picture images thereon and a point light source disposed behind each of said transparencies for projecting light therethrough onto said screen, adjustment means for simultaneously imposing upon said transparencies synchronized tilting movements about pitch, roll and yaw axes and means for translationally moving one of said transparencies relative to another thereof in transverse generally horizontal directions, means mounting said light sources behind said transparencies so as to be vertically adjustable relative thereto, helicopter control simulating means manually adjustable in simulation of helicopter flight control movements, and means transmitting effects of adjustments of said controls to said transparency and light source adjustment means.

3. A helicopter flight simulator, and pilot ground trainer comprising a stationary pilot cockpit, a scenery picture projection unit disposed closely above the position of said cockpit, a picture receiving screen of fragmental spheroidal form extending in continuously curving form from in front of said cockpit around to opposite sides thereof disposed substantially concentrically of said projection unit and generally ahead of the cockpit, said projection unit comprising a plurality of scene objectives and a point light source disposed behind each of said objectives for projecting light therethrough onto said screen, means mounting said objectives for rotational movements about pitch, roll and yaw simulating axes and for translational movements in transverse generally horizontal directions, means mounting said light sources behind said objectives so as to be vertically adjustable relative thereto while being independent of translational movement thereof, helicopter control simulating means in said cockpit and manually adjustable in simulation of helicopter flight control movements, and means transmitting effects of adjustments of said controls to said objectives and light source adjustment means.

4. A helicopter flight simulator and pilot ground trainer comprising a picture projection unit, a picture receiving screen, said projection unit comprising a plurality of scene objectives each having a light source disposed for projecting light onto said screen, means for simultaneously rotating said objectives in synchronized movements about pitch, roll, and yaw axes, and means for translationally moving at least one of said objectives relative to another thereof in transverse generally horizontal directions, means mounting said light sources behind said objectives so as to be vertically adjustable relative thereto while rotating with said objectives, helicopter control simulating means manually adjustable in simulation of helicopter flight control movements, and means transmitting effects of adjustments of said controls to said objective and light source motion control means.

5. In a helicopter flight simulator and pilot ground trainer, a picture projection unit, a picture receiving screen, said projection unit comprising a plurality of transparencies each having picture images thereon and a light source disposed behind each of said transparencies for projecting light therethrough onto said screen, adjustment means for simultaneously imposing upon said transparencies synchronized tilting movements about pitch, roll, and yaw axes, and means for translationally moving at least one of said transparencies relative to another thereof in transverse generally horizontal directions, means mounting said light sources behind said transparencies so as to be vertically adjustable relative thereto, helicopter control simulating means manually adjustable in simulation of helicopter flight control movements, and means transmitting effects of adjustments of said controls to said transparency and light source adjustment means.

6. A helicopter flight simulator and pilot ground trainer comprising a student-pilot cockpit, a scenery picture projection unit disposed above the position of said cockpit, a picture receiving screen of fragmental spheroidal form extending in continuously curving form from in front of said cockpit around to opposite sides thereof and disposed generally ahead of the cockpit, said projection unit comprising a plurality of scene objectives and a point light source disposed behind each of said objectives for projecting light therethrough onto said screen, means mounting said objectives for simultaneous rotational movements about pitch, roll, and yaw simulating axes and for simultaneous translational movements in horizontal directions, means mounting said light sources behind said objectives so as to be vertically adjustable relative thereto while being independent of translational movements thereof, helicopter control simulating means in said cockpit and manually adjustable in simulation of helicopter flight control movements, and means transmitting effects of adjustments of said controls to said objectives and light source adjustment means.

7. A helicopter flight simulator and pilot ground trainer comprising a stationary pilot cockpit, a picture projection unit disposed closely above the position of said cockpit, a picture receiving screen of fragmental spheroidal form extending in continuously curving form from in front of said cockpit around the opposite sides thereof and disposed substantially concentrically of said projection unit throughout the area ahead of the cockpit, said projection unit comprising a plurality of transparencies having picture projection images thereon and a light source disposed behind each of said transparencies for projecting light therethrough onto said screen, adjustment means for imparting to said transparencies tilting movements about pitch, roll, and yaw axes and translational movements in transverse generally horizontal directions, helicopter control simulating means in said cockpit and manually adjustable in simulation of helicopter flight control movements, an analog computer, means transmitting effects of adjustments of said controls to said computer, instructor controls manipulatable to transmit external flight influence effects to said computer, and servomechanisms operatively connecting the output phase of said computer to said transparency adjustment means for actuating the latter in accord with variations in the outputs of said computer.

8. A helicopter flight simulator and pilot ground trainer comprising a student pilot cockpit, a scenery picture projection unit disposed closely above the position of said cockpit, a picture receiving screen of fragmental spheroidal form extending in continuously curving form from in front of said cockpit around to opposite sides thereof and disposed substantially concentrically of said projection unit, said projection unit comprising a scene objective and a light source disposed behind said objective for projecting light therethrough onto said screen, means mounting said objective for rotational movements about pitch, roll, and yaw simulating axes and for translational movements in transverse generally horizontal directions, means mounting said light source behind said objective so as to be vertically adjustable relative thereto while being independent of translational movements thereof, helicopter control simulating means in said cockpit and manually adjustable in simulation of helicopter flight control movements, and means transmitting effects of adjustments of said controls to said objective and light source adjustment means.

9. A helicopter flight simulator and pilot ground trainer comprising a picture projection unit, a picture receiving screen, said projection unit comprising a plurality of scene objectives each having a light source disposed for projecting light onto said screen, means for simultaneously rotating said objectives in synchronized movements about pitch, roll, and yaw axes, and means for translationally moving at least one of said objectives relative to another thereof in transverse generally horizontal directions, means mounting said light sources behind said objectives so as to be vertically adjustable relative thereto while rotating with said objectives, helicopter control simulating means manually adjustable in simulation of helicopter flight control movements, an analog computer mechanism, means transmitting effects of adjustments of said controls to said analog computer, and servomechanisms actuated by variable outputs from said computer to operate said objective and light source motion control means.

10. A helicopter flight simulator and pilot ground trainer comprising a stationary pilot cockpit, a picture projection unit disposed closely above the position of said cockpit, a picture receiving screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a plurality of transparencies each having picture images thereon and a point light source disposed therebehind for projecting light therethrough onto said screen, said transparencies being carried by said suspension member to be pivotable therewith in "pitch" and "roll" senses while being rotatable relative to said suspension member about "yaw" axes, at least one of said transparencies being translationally movable relative another thereof and to said suspension member in generally horizontal directions, servomechanisms for imparting to said transparencies movement in "pitch," "roll," and "yaw" and translationally, means mounting said light sources behind said transparencies so as to be vertically adjustable relative thereto, helicopter control simulating means in said cockpit and manually adjustable in simulation of helicopter flight control movements, an analog computer, means transmitting effects of adjustments of said controls to said computer, means operatively connecting the output phase of said computer to said transparency, and light source vertical adjustment control servomechanisms for actuating the latter in accord with variable outputs of said computer.

11. A helicopter flight simulator and pilot ground trainer comprising a stationary pilot cockpit, a picture projection unit disposed closely above the position of said cockpit, a picture receiving screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a plurality of objective supports each having scene objectives thereon and a point light source disposed therebehind for projecting light therethrough upon said screen, said supports being carried by said suspension member to be pivotable therewith in "pitch" and "roll" senses while being rotatable relative to said suspension member about "yaw" axes, at least one of said supports being translationally movable relative to said suspension member and to its light source in generally horizontal directions, servomechanisms for imparting to said supports movement in "pitch," "roll," and "yaw" and translationally, means mounting said light sources so as to be vertically adjustable relative to said supports, helicopter control simulating means in said cockpit and manually adjustable in simulation of helicopter flight control movements, an analog computer, means transmitting effects of adjustments of said controls to said computer, means operatively connecting the output phase of said computer to said support, and light source vertical adjustment control servomechanisms for actuating the latter in accord with variable outputs of said computer.

12. A helicopter flight simulator and pilot ground trainer comprising a pilot cockpit, a scene projection unit disposed closely above the position of said cockpit, a screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a scene objective frame having scene images thereon and a point light source disposed therebehind for projecting light therethrough upon said screen, said objective frame being slidably mounted upon a support for generally horizontal sliding movements thereon, said support being slidably mounted on said suspension member for generally horizontal movements thereon in transverse directions, whereby said objective frame is carried by said suspension member to be shiftable thereon in transverse horizontal directions and pivotable therewith in "pitch" and "roll" senses while being rotatable relative to said suspension member about a "yaw" axis, servomechanisms for imparting to said frame shifting and pivoting movements in "pitch," "roll," and "yaw," means mounting said light source behind said objective images so as to be vertically adjustable relative thereto, helicopter control simulating means in said cockpit and manually adjustable in simulation of helicopter flight control movements, an analog computer, means transmitting effects of adjustments of said controls to said computer, means operatively connecting the output phase of said computer to said frame, and light source vertical adjustment control servomechanisms for actuating the latter in accord with variable outputs of said computer.

13. A helicopter flight simulator and pilot ground trainer comprising a stationary pilot cockpit, a picture projection unit disposed closely above the position of said cockpit, a picture receiving screen of spheroidal form disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a plurality of transparencies each having picture images thereon and a point light source disposed therebehind for projecting light therethrough onto said screen, said transparencies being carried by said suspension member to be pivotable therewith in "pitch" and "roll" senses while being rotatable relative to said suspension member about "yaw" axes, servomechanisms for imparting to said transparencies movements in "pitch," "roll," and "yaw," means mounting said light sources behind said transparencies so as to be vertically adjustable relative thereto, helicopter control simulating means in said cockpit and manually adjustable in simulation of helicopter flight control movements, flight indicating instruments in said cockpit including an altimeter, an analog computer, means transmitting effects of adjustments of said controls to said computer, means operatively connecting the output phase of said computer to said transparency, light source vertical adjustment control servomechanisms for actuating the latter in accord with variable outputs of said computer, and means actuating said instruments in simulation of the flight responses to said controls.

14. A helicopter flight simulator and pilot ground trainer comprising a stationary pilot cockpit, a picture projection unit disposed closely above the position of said cockpit, a picture receiving screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a main transparency having picture images thereon and a point light source disposed therebehind for projecting light therethrough onto said screen, said transparency being carried below said suspension member to be shiftable thereon in horizontal direction and pivotable therewith in "pitch" and "roll" senses while being rotatable relative to said suspension member about a "yaw" axis, an "autorotation" transparency detachably mounted upon said suspension member below said main transparency in vertically spaced relation thereto, servomechanisms for imparting to said transparencies shifting and pivoting movements in "pitch," "roll," and "yaw," helicopter control simulating means in said cockpit and manually adjustable in simulation of helicopter flight control movements, an analog computer, means transmitting effects of adjustments of said controls to said computer, means operatively connecting the output phase of said computer to said transparency, and light source vertical adjustment control servomechanisms for actuating the latter in accord with variable outputs of said computer.

15. A helicopter flight simulator and pilot ground trainer comprising a stationary pilot cockpit, a picture projection unit disposed closely above the position of said cockpit, a picture receiving screen of spheroidal form disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a main transparency having picture images thereon and a point light source disposed therebehind for projecting light therethrough onto said screen, said transparency being carried below said suspension member to be shiftable thereon in horizontal direction and pivotable therewith in "pitch" and "roll" senses while being rotatable relative to said suspension member about a "yaw" axis, an "autorotation" transparency detachably mounted upon said suspension member below said main transparency in vertically spaced relation thereto, said "autorotation" transparency comprising a base plate rigidly mounted to said suspension member, a slide plate transversely shiftable thereon, a slide bar extending rigidly forwardly of said slide plate, a transparent housing shiftable upon said slide bar, said transparent housing having picture images thereon and a point light source disposed therebehind for projecting light therethrough onto said screen, servomechanisms for imparting to said transparencies shifting and pivoting movements in "pitch," "roll," and "yaw," helicopter control simulating means in said cockpit and manually adjustable in simulation of helicopter flight control movements, an analog computer, means transmitting effects of adjustments of said controls to said computer, means operatively connecting the output phase of said computer to said transparency, and light source vertical adjustment control servomechanisms for actuating the latter in accord with variable outputs of said computer.

16. A helicopter flight simulator and pilot ground trainer comprising a grounded pilot cockpit, a scenery projection unit comprising a screen in view of the pilot when seated in the cockpit and a projector, said projector comprising a structure mounting projection objectives and a light source disposed therebehind to project light through said objectives upon said screen, said light source being vertically movable relative to said structure whereby to shift the scenery projection upon said screen to simulate helicopter altitude changes, pilot operable control means in the cockpit adjustable in simulation of helicopter control motions, means operable by said control motions to actuate a servomechanism motivating the light source to move in vertical directions, switch means operable by said light source upon attainment thereof at a position relative to said projector structure corresponding to landing contact position of the helicopter, and solenoid means coupled to said cockpit and controlled by said switch means to impart to said cockpit a simulated landing shock of an order consistent with the simulated vertical velocity of the helicopter at the time of the landing contact.

17. A helicopter flight simulator and pilot ground trainer comprising a grounded pilot cockpit, a scenery projection unit comprising a screen in view of the pilot when seated in the cockpit and a projector, said projector comprising a structure mounting projection objectives and a light source disposed therebehind to project light through said objectives upon said screen, said projector and light source being pivotable as a unit about pitch, yaw, and roll axes and said projector being movable translationally relative to said light source in transverse generally horizontal directions, and said light source being vertically movable relative to said projector, whereby to shift the scenery projection upon said screen to simulate pitching, rolling, and yawing of the aircraft and horizontal movements thereof and altitude changes thereof, pilot operable control means in the cockpit adjustable in simulation of helicoptor control motions, means responsive to said control motions to actuate servomechanisms motivating the projector to pivot with the light source and to move horizontally relative thereto and to cause the light source to move in vertical directions, and a device for introducing simulations of random variable magnitude rough air or gust effects to actuate said servomechanisms independently of the pilot control thereof, said device comprising a constant speed shaft driving a plurality of connecting rods in cyclic outof-phase relation, said connecting rods being coupled to a mixing lever driving the control shaft of a multiple potentiometer, whereby the latter is rotated in random fashion, the output signals of said potentiometer being conducted to the servomechanism controls thereby producing on the screen simulations of rough air or gust effects.

18. A helicopter flight simulator and pilot ground trainer comprising a grounded pilot cockpit, a scenery projection unit comprising a screen in view of the pilot when seated in the cockpit and a projector, said projector comprising a structure mounting projection objectives and a light source disposed therebehind to project light through said objectives upon said screen, said projector and light source being pivotable as a unit about pitch, yaw, and roll axes and said projector being movable translationally relative to said light source in transverse generally horizontal directions and said light source being vertically movable relative to said projector, whereby to shift the scenery projection upon said screen to simulate pitching, rolling, and yawing of the aircraft and horizontal movements thereof and altitude changes thereof, pilot operable control means in the cockpit adjustable in simulation of helicoptor control motions, means responsive to said control motions to actuate servomechanisms motivating the projector to pivot with the light source and to move horizontally relative thereto and to cause the light source to move in vertical directions, and a device for introducing simulations of variable engine speed effects comprising a pilot engine speed control member, and an engine noise and vibration simulation mechanism variable operable to simulate changes in engine speed as controlled by said pilot engine speed control member.

19. A helicopter flight simulator and pilot ground trainer comprising a stationary pilot cockpit, a picture projection unit disposed closely above the position of said cockpit, a picture-receiving screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a plurality of transparencies each having picture images thereon and a point light source disposed therebehind for projecting light therethrough onto said screen, said transparencies being carried by said suspension member to be pivotable therewith in "pitch" and "roll" senses while being rotatable relative to said suspension member about "yaw" axes, servomechanisms for imparting to said transparencies movements in "pitch," "roll," and "yaw," adjustable means mounting said light sources behind said transparencies so as to be vertically adjustable relative thereto, helicopter control simulating means in said cockpit and manually adjustable in simulation of helicopter flight control movements, an analog computer, means transmitting effects of adjustments of said controls to said computer, means operatively connecting the output phase of said computer to said transparency, and light source vertical adjustment control servomechanisms for actuating the latter in accord with variable outputs of said computer, and a control system for said servomechanisms independent of said computer and manually operable to control the transparency and light source movements in lieu of said computer.

20. In a helicopter flight simulator and pilot ground trainer a scenery projection unit, a receiving screen, said projection unit comprising a plurality of transparencies, at least one of said transparencies having a vertically disposed scene objective and at least one of said transparencies having a horizontally disposed scene objective, a light source disposed behind each of said objectives for projecting light therethrough upon said screen, adjustment means for simultaneously imparting to said transparencies synchronized tilting movements about pitch, roll, and yaw axes, means for translationally moving at least one of said transparencies relative to another thereof in transverse generally horizontal directions, adjustable means mounting said light sources behind said transparencies so as to be vertically adjustable relative thereto, helicopter control simulating means manually adjustable in simulation of helicopter flight control movements, and means transmitting effects of adjustments of said controls to said transparency and light source adjustment means.

21. A helicopter flight simulator and pilot ground trainer comprising a stationary pilot cockpit, a scene projection unit disposed above the position of said cockpit, a screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a plurality of objective supports each having scene objectives thereon and a point light source disposed therebehind for projecting light therethrough upon said screen, said supports being carried by said suspension member to be pivotable therewith in "pitch" and "roll" senses while being rotatable relative to said suspension member about "yaw" axes, servomechanisms for imparting to said supports movements in "pitch," "roll," and "yaw," adjustable means mounting said light sources so as to be vertically adjustable relative to said supports, helicopter control simulating means in said cockpit and manually adjustable in simulation of helicopter flight control movements, an analog computer, means transmitting effects of adjustments of said controls to said computer, and means operatively connecting the output phase of said computer to said support and light source control servomechanisms for actuating the latter in accord with variable outputs of said computer.

22. A helicopter flight simulator and pilot ground trainer comprising a stationary pilot cockpit, a picture projection unit disposed closely above the position of said cockpit, a picture receiving screen of fragmental spheroidal form extending in continuously curving form from in front of said cockpit around to opposite sides thereof and disposed substantially concentrically of said projection unit throughout the area alongside and ahead of the cockpit, said projection unit comprising a gimbal frame mounted to pivot upon a "pitch" axis and carrying a suspension member pivotable on said frame about a "roll" axis, a plurality of objective supports each having scene objectives thereon and a point light source disposed therebehind for projecting light therethrough upon said screen, said supports being carried by said suspension member to be pivotable therewith in "pitch" and "roll" senses while being rotatable relative to said suspension member about "yaw" axes, at least one of said supports being translationally movable relative to said suspension member and to its light source in generally horizontal directions, servomechanisms for imparting to said supports movement in "pitch," "roll," and "yaw" and translationally, adjustable means mounting said light sources so as to be vertically adjustable relative to said supports, helicopter pilot control means in said cockpit, instructor controls independent of said pilot control means, said pilot and instructor controls being independently manually adjustable in simulation of helicopter flight control movements, an analog computer, means transmitting effects of adjustments of said controls to said computer, and means operatively connecting the output phase of said computer to said support and light source control servomechanisms for actuating the latter in accord with variable outputs of said computer.

References Cited in the file of this patent

UNITED STATES PATENTS

| | | |
|---|---|---|
| 1,654,391 | Thornton | Dec. 27, 1927 |
| 1,675,595 | Bouin | July 3, 1928 |
| 1,917,611 | Starr | July 11, 1933 |
| 2,054,417 | Gramsa | Sept. 15, 1936 |
| 2,280,206 | Waller et al. | Apr. 21, 1942 |
| 2,350,351 | Grunberg | June 6, 1944 |
| 2,385,095 | McCarthy | Sept. 18, 1945 |
| 2,396,660 | Kanter | Mar. 19, 1946 |
| 2,417,354 | Daly | Mar. 11, 1947 |
| 2,425,863 | Carlson | Aug. 19, 1947 |
| 2,474,096 | Dehmel | June 21, 1949 |
| 2,518,419 | Dehmel | Aug. 8, 1950 |
| 2,521,405 | Phelps | Sept. 5, 1950 |
| 2,608,005 | Kennedy | Aug. 26, 1952 |
| 2,687,580 | Dehmel | Aug. 31, 1954 |
| 2,711,594 | Hickey | June 28, 1955 |

OTHER REFERENCES

Flight Simulation for Helicopters, The Aeroplane (British Magazine), Dec. 10, 1954, pages 847 to 849.